United States Patent

Feagan

[15] 3,646,690

[45] Mar. 7, 1972

[54] APPARATUS AND METHOD FOR CONVEYING INFORMATION

[72] Inventor: Robert L. Feagan, 4905 Lindell, St. Louis, Mo. 63108

[22] Filed: Nov. 14, 1969

[21] Appl. No.: 876,664

[52] U.S. Cl. .................................................35/16
[51] Int. Cl. ............................................G09b 25/04
[58] Field of Search....................35/7 R, 7 A, 16, 24 A, 24 B; 248/DIG. 3; 46/16, 19

[56] References Cited

UNITED STATES PATENTS

| | | | |
|---|---|---|---|
| 1,845,240 | 2/1932 | Cook | 35/16 |
| 2,407,808 | 8/1946 | Armbright | 35/7 R |
| 2,589,812 | 3/1952 | Hoskins | 35/24 B |
| 2,738,584 | 3/1956 | Parker | 35/16 X |
| 2,871,619 | 2/1959 | Walters | 35/16 X |
| 2,907,122 | 10/1959 | Dasey | 35/16 |
| 2,915,831 | 12/1959 | Parker | 35/16 |
| 3,191,318 | 6/1965 | Hoffmann | 35/24 A X |

FOREIGN PATENTS OR APPLICATIONS 130,175  11/1950  Sweden.....................................46/16

Primary Examiner—Harland S. Skogquist
Attorney—Polster and Polster

[57] ABSTRACT

Information relevant to proposed construction is conveyed by mounting planning element representations on a base or bases in unambiguous relation to reference lines on the base or bases. A mensuration strip is removably mounted in direct identifying relation to particular identified reference lines. The base has a multiplicity of holes consistently positioned with respect to and spaced along the reference lines. Representations of planning elements in the form of model pieces, dimensionally stable and self-supporting, each has a plurality of pegs projecting from an edge, the pegs being spaced to fit into spaced ones of the holes in the base. Saddle-shaped opening designations are removably mounted on dimensionally stable self-supporting model wallpieces. A flat pattern of a building model may be used, scale related to spacing of holes in a base, suitable for penetration by model piece pegs. Indicia of reference standard details are mounted in unambiguous relation to at least one reference line on the base and in clear relation to a representation of a planning element. Construction details may be a part of a representation of a planning element. Exterior building (facing) elements, e.g., outside wall surfaces, doors, windows, roof surfaces, on a common scale, mounted in projective relationship, in the relation of elevation to plan, to model pieces on the base. Information conveyed by the reference lines, mensuration strip and indicia of reference standard details being assimilable by a digital computer.

23 Claims, 69 Drawing Figures

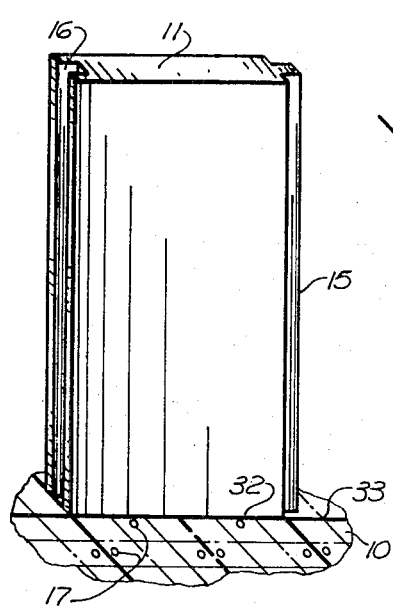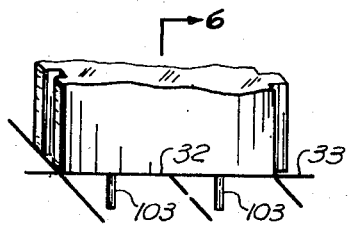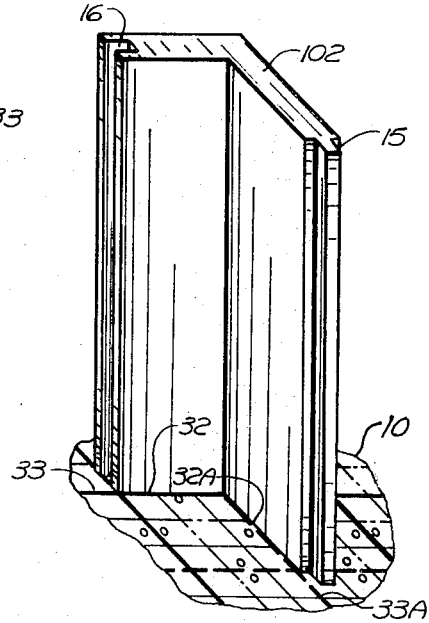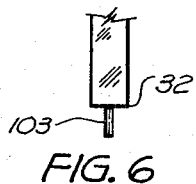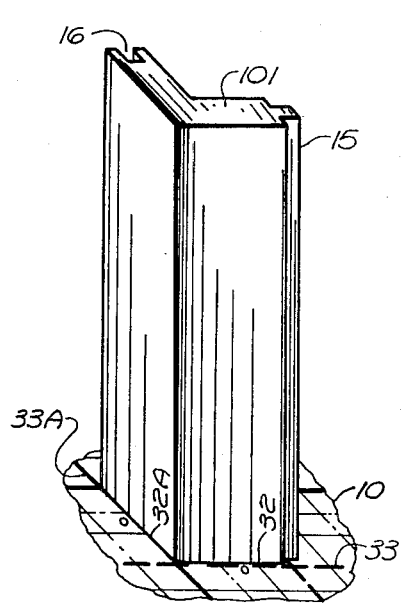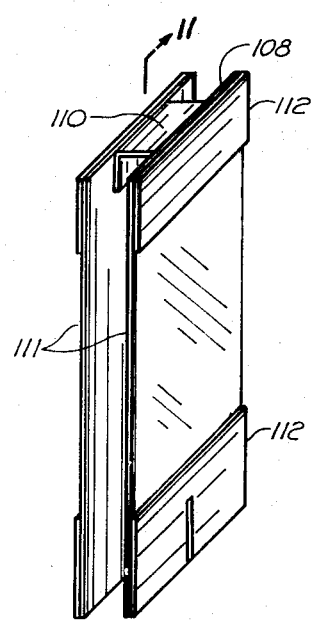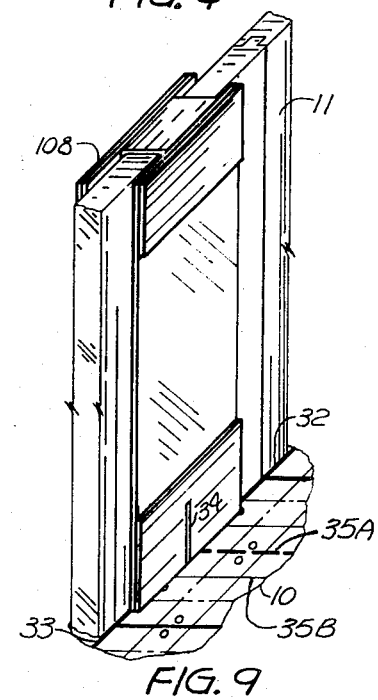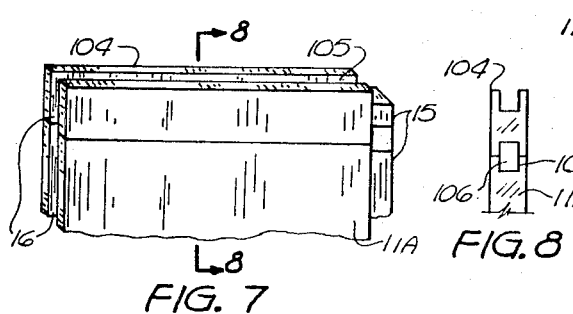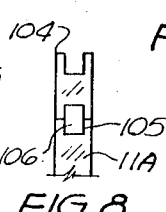

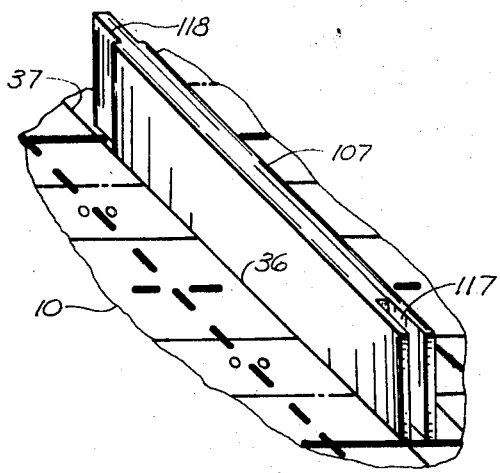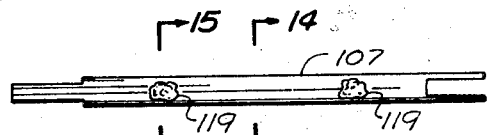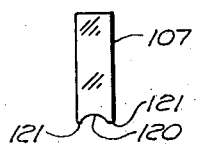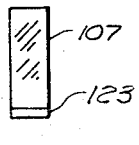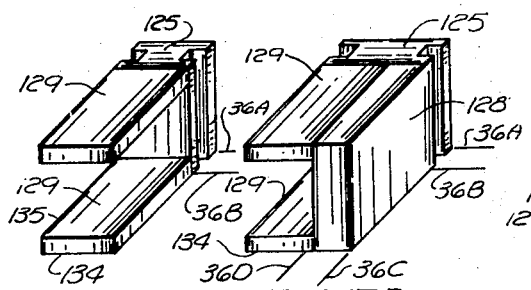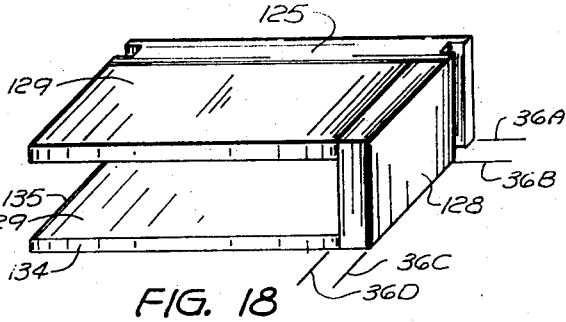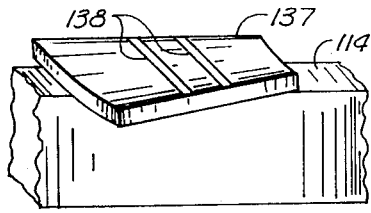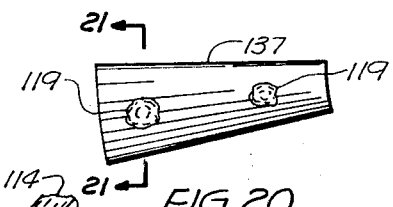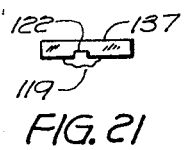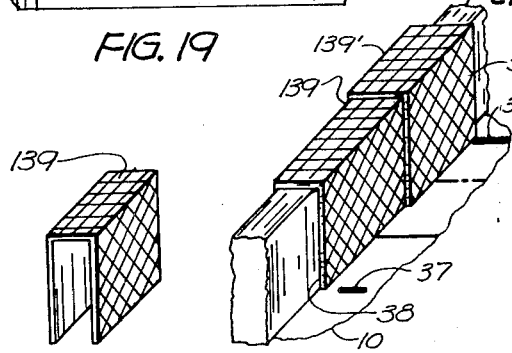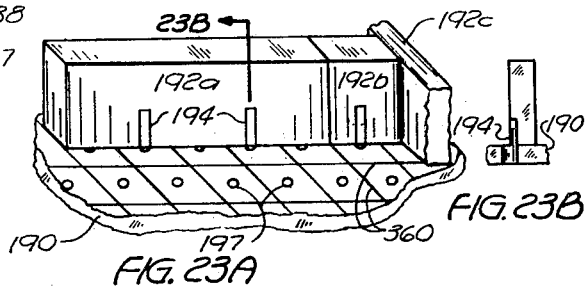

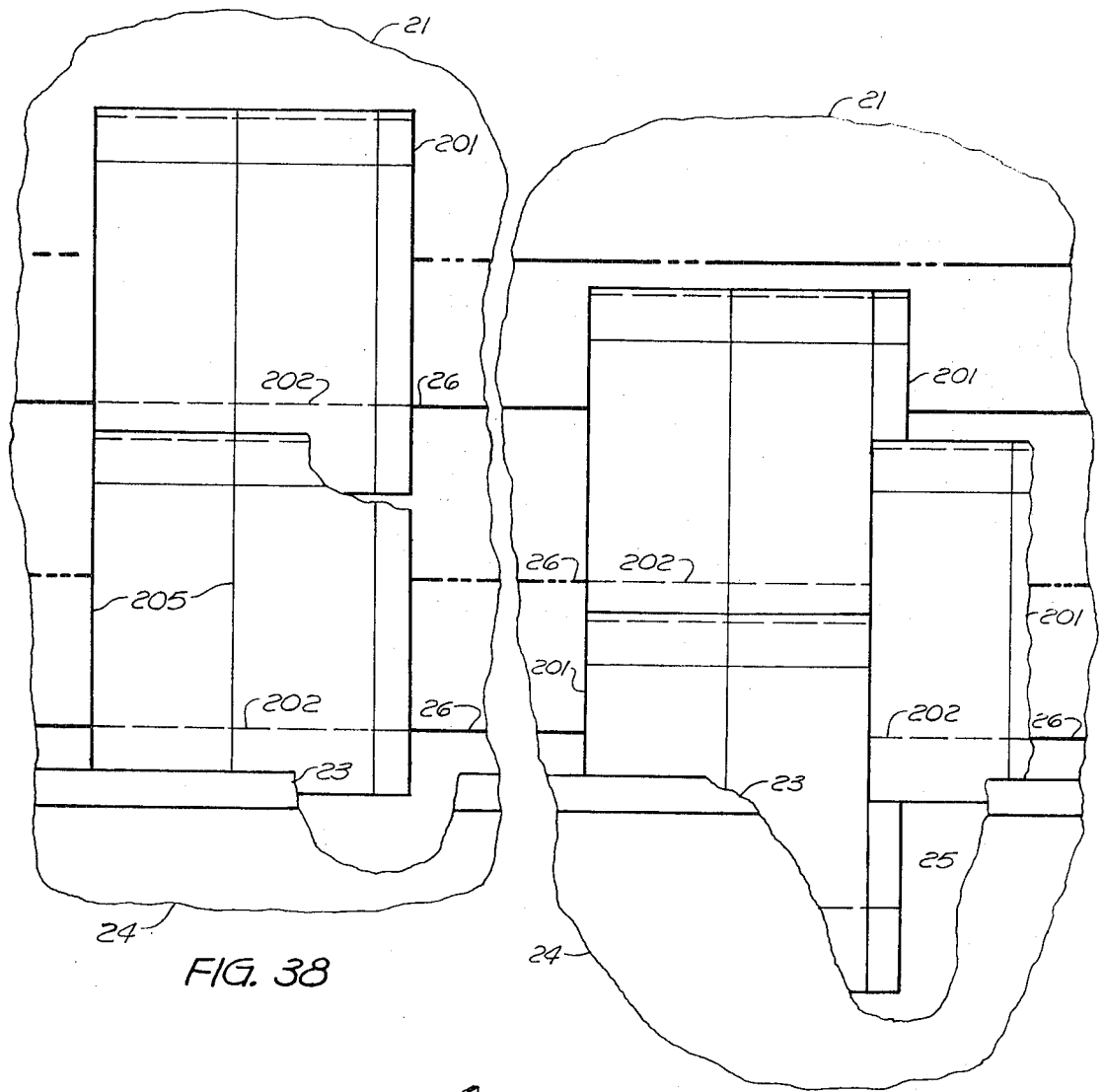
FIG. 38
FIG. 39
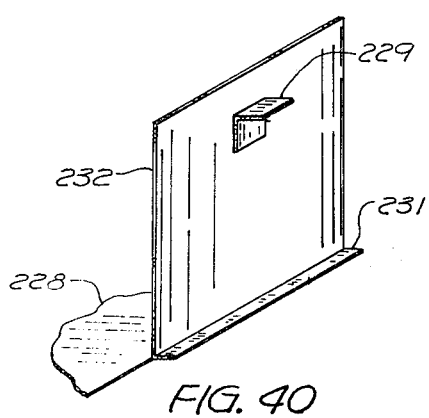
FIG. 40

INVENTOR
ROBERT L. FEAGAN

PATENTED MAR 7 1972 3,646,690

INVENTOR
ROBERT L. FEAGAN
BY
ATTORNEY

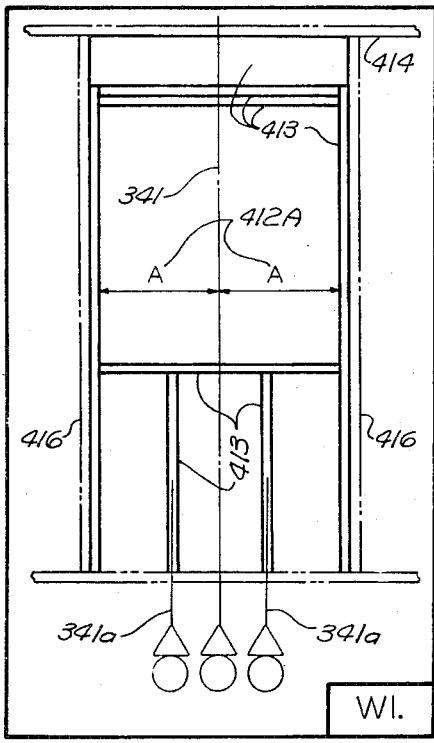
FIG. 51 — W1.
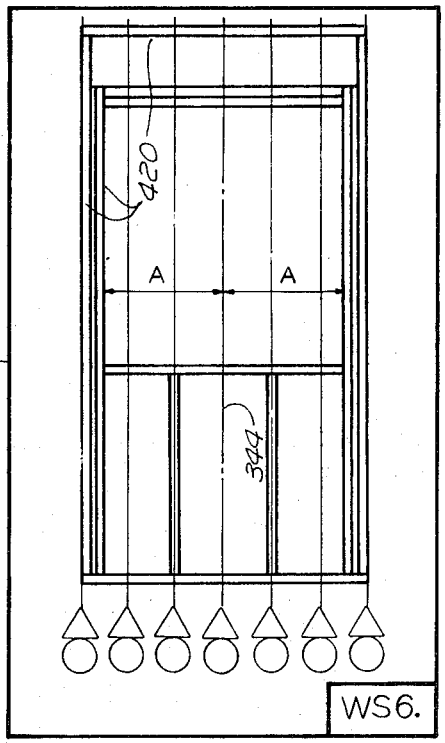
FIG. 52 — WS6.
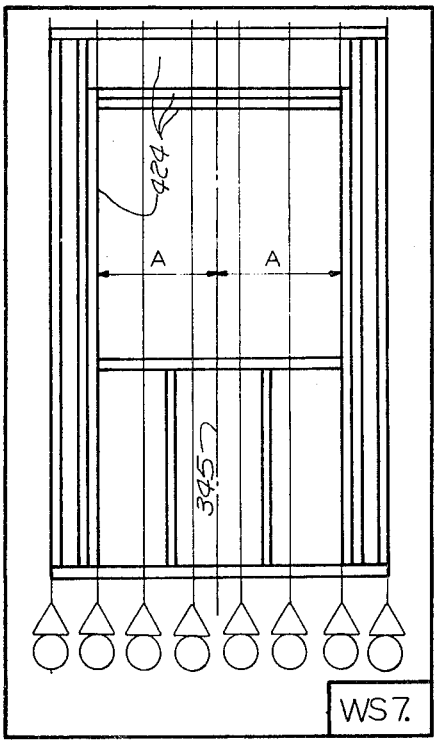
FIG. 53 — WS7.
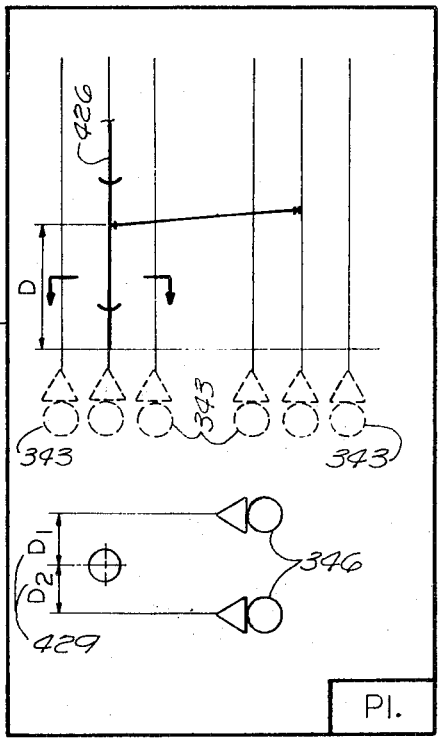
FIG. 54 — P1.

INVENTOR
ROBERT L. FEAGAN
BY
ATTORNEY

APPARATUS AND METHOD FOR CONVEYING INFORMATION

BACKGROUND OF THE INVENTION

Some of the factual relations involved in the present invention require a certain nicety of distinction which has been largely overlooked in the planning and execution of construction. The term construction includes, but is not restricted to buildings, structures, piping installations and the like.

It is considered desirable to provide definitions of certain terms.

The term "conveyance" or "conveys" is a general term which means transfer in intelligible form (of useful information).

One of the features of the apparatus of this invention is that it provides models of construction. By a model is meant an assembly of physical pieces which conveys a more or less to-scale "likeness" of buildings, structures and the like. This likeness is conveyed by pieces which resemble general planning features such as walls, partitions, doors, toilet fixtures and the like.

The physical pieces which are used to provide models of construction may be generally described as follows:

Three dimensional model pieces having perceptible depth, width and breadth. Examples are vertical standing wallpieces, fixture pieces and the like.

Flat model pieces are pieces made from thin sheet materials such as paper. Examples are toilet fixtures, exterior wall texture pieces and the like.

Generally, models are assembled from three dimensional pieces or a combination of three dimensional pieces and flat pieces.

The term "base" means a support for model pieces or representations with at least one plane surface. Ordinarily the plane surface of a base is horizontal, but it may be vertical or lie at some angle between. Preferably the base has on a surface or surfaces upon which three dimensional and flat model pieces or representations are to be mounted, base reference lines forming a grid. Normally, the grid will be rectilinear although other forms of grid are possible.

The base may, and preferably does, include "panels" hinged or fixed. The panels are adapted to support facing element model pieces in such a way that they can be viewed, in the relationship of elevation to plan with respect to a plane surface of the base, in projective relation to model pieces mounted on the plane surface of the base.

A model of construction is useful in itself. A model may be an educational toy, or it may be of existing construction. A model as described above does not convey sufficient specific information to identify and specifically define the pieces required for proposed construction for which a model may be assembled. In this invention, model pieces are important in "construction arrangements," which term is of special significance and is defined hereinafter.

The term "planning element" means broadly any material, shape, structure or part used to achieve a desired function or appearance in a building, structure or the like represented by a "construction arrangement." In conventional wood framing construction, external walls, partitions, foundations, joists, floors and the like, and the parts which make them up, such, e.g., as plates and studs in walls are examples of planning elements. Also included in the term are elements such as electrical wiring, water and sewer piping, heating system duct work and the like; fixture elements, which include broadly conventional fixtures such as bathroom fixtures, and also cabinets, major appliances and the like, which though they do not contribute to the supportive structure, may be looked upon as permanent elements of the building; facing elements, which are essentially elements of appearance, such as paint or wallpaper, carpeting, textured brick, shingle surfaces and the like, and transient elements such as furniture.

This invention recognizes that from the standpoint of conveying specific information three broad classes of planning elements exist. These classes are: "Primary Planning Elements," "Appurtenant Planning Elements" and "Detail Planning Elements."

By "primary planning elements" is meant those planning elements which achieve the general function of the construction. In the execution of construction numerous pieces must be fabricated and attached together to achieve a desired relative location of primary planning elements. Thus in conventional wood framing residential construction, walls, floors, toilet fixtures and the like may be considered as primary planning elements. People who plan construction choose among various combinations of representations of primary planning elements to arrive at a construction arrangement.

The term "appurtenant planning elements" means those planning elements which are related to and necessary for primary planning elements but which are not generally included among those planning elements represented in a construction arrangement. Thus in conventional wood framing, a wall footing, an eave fascia and soffit, heating system duct work and the like may be considered as appurtenant planning elements.

The term "detail planning elements" means specific pieces, parts, shapes and assemblies which are used in primary planning elements and appurtenant planning elements. Thus, in conventional wood framing, a stud in a partition, a sanitary T-branch in a soil stack, reinforcing bars in a footing and the like may be considered as "detail planning elements."

A "standard component" is a planning element which in combination with other standard components achieves a large planning element. As used herein the term implies prefabrication and consignment to inventory from which the components may be drawn for use to achieve specific construction. A standard component may have detail planning elements provided to accommodate requirements of "planning element interfaces." Thus, in conventional wood-framing construction standard components for exterior walls, floors, partitions, drain piping, basement foundation walls and the like may be provided.

By a "planning element interface" is meant the meeting plane or joining of planning elements, generally primary or appurtenant planning elements. The meeting of partitions, partitions and exterior walls, partitions and floor, drain pipe and floor and partition, floor beam and foundation wall, are examples of planning element interfaces.

The term "representation" is used to describe a physical apparatus piece of this invention bearing a direct relationship to a planning element in proposed construction represented by a construction arrangement. Examples of representations are: an exterior wall model piece which has a direct relation to the actual wall structure; a flat piece which illustrates a footing; a line which illustrates a joist or a stud. A representation may be in the form of a self-supporting part the length of which represents the length of a wall section standard component.

Each of the broad classes of planning elements is provided with representations in this invention. Thus representations of primary planning elements, appurtenant planning elements, detail planning elements and standard component planning elements are provided. Generally, representations of primary planning elements are model pieces.

The term "association line" or "association lines" refers to observable lines or implied centerlines on a representation. Thus an index line or index lines on a fixture representation are association lines. A line representing a joist or stud is an association line. Lines representing a planning element interface in a standard component representation are association lines. Similarly a bottom edge of a three-dimensional model piece representation of a wall segment is an association line. As an alternate to an edge, an implied centerline of the representation of a wall segment may be recognized as an association line.

Representations of primary planning elements require a suitable identification which conveys information on detail planning elements for the primary planning elements. Representations of primary planning elements which are three dimensional model pieces and flat model pieces generally may be recognized and named by their shapes. However, a supplementary specification of identification is necessary for such representations. For example, a model wallpiece doe not generally convey information on size and spacing of studs, structural facing materials etc., (assuming that wood framing is to be used). Suitable identification of primary planning element representations may be accomplished by "Supplementary Specification" which is used in conventional architectural and engineering practice.

By the term "construction arrangement" is meant a visual composite representation which conveys general function, size and location of primary planning elements in proposed construction. In this invention, new methods for detailing are disclosed, as is well known to those skilled in the arts of general planning and detailing, the location of primary planning elements as conveyed by a construction arrangement must be in terms of units of a measuring device. As used in this invention a "construction arrangement" has representations of primary planning elements; the number of primary planning elements represented is the number necessary for detailing all or a portion of the construction arrangement; and the location of primary planning elements is conveyed in terms of units of a measuring device. Suitable identification of primary planning elements is necessary but this may be accomplished by supplementary specification or by indicia of reference standard details. In conventional architectural and engineering practice, general plan views and elevations is the construction arrangement. These drawings in general have drawing symbols and dimensions which convey relative locations of primary planning elements in the proposed construction.

By means of the present invention construction arrangements of a special nature are achieved. These construction arrangements are characterized by a conveyance of locations of primary planning elements in terms of measurement units which require a measuring device divided into whole units scale related to reference line spacing in the construction arrangement. The whole units in the measuring device may be subdivided to allow measurement of location of primary planning elements which location is unequivocally conveyed by location of the representation in relation to the reference lines. In the present embodiment of this invention the measuring device is divided into whole units and subdivided into half units. This type of construction arrangement is termed an "unambiguous placement construction arrangement." The representations of primary planning elements must have suitable identification.

"General Planning" is the process of making a construction arrangement. In conventional architectural and engineering practice this is accomplished with paper, pencil, erasers, straight edges and related drafting tools. In General Planning choices of relations among primary planning elements and conveyance of these relations are involved.

The term "detailing" means producing a conveyance of sizes, quantities, measurements, locations and other information regarding appurtenant and detail planning elements of a construction arrangement. Detailing produces "detail information for construction."

By "reference standard detail" is meant "construction details" which contain on evident reference line or lines. The reference standard details have suitable indicia preferably related to the identification of primary planning elements. The reference line or lines are generally recognized as association lines in representations. The dimensions of the construction details are referenced to or "tied into" the evident reference line or lines.

Reference standard details fall into three general classifications: One classification is those reference standard details which define detail planning elements of primary planning elements. Thus, a reference standard detail may be used to show stud size and spacing in an exterior wall. A second classification is those reference standard details which define detail planning elements of appurtenant planning elements and the location of appurtenant planning elements with respect to primary planning elements. Thus a reference standard detail may be used to define details of a wall footing and the location of the footing with respect to exterior wall and the floor. A third classification is reference standard details which define detail planning element requirements at planning element interfaces. Thus a reference standard detail may be used to define the location of rafters in relation to a chimney.

The indicia of reference standard details may be used for suitable identification of primary planning elements and to represent appurtenant planning elements in a construction arrangement. Thus the identification of an exterior wall representation which is a primary planning element may include an indicium of the reference standard detail defining the detail planning elements of the exterior wall and an indicium of a reference standard detail which represents the appropriate basement wall and footing to be used with the exterior wall represented. This is termed "construction arrangement identification of planning elements by applied indicia."

Representations of appurtenant planning elements may be identified by indicia of reference standard details. Representations of detail planning elements are suitably identified by specific reference standard detail indicia or terminology. Representations of detail planning elements at "interfaces" may be identified by indicia of reference standard details of planning elements meeting at the interfaces.

By "construction details" is meant a drawing which is dimensioned and annotated to convey measurements required to fabricate detail planning elements, that is, individual pieces and assemblies of pieces, and to locate detail planning elements relative to each other. Each detail planning element is suitably identified, for example, by name. Supplementary information such as reference to indicia of other standard details, specifications for material and other useful information may be included in the construction details.

Construction details may be a part of a representation, a plane surface of the representation serving as the drawing surface.

Prior practice in "detailing" of a construction arrangement requires a person's having knowledge of the manner in which detail planning elements fit together in construction, and he must also have knowledge of the requirements for complete conveyance of detail information for construction.

Detailing of an "unambiguous placement construction arrangement" with "identification of planning elements by applied indicia" may be accomplished, in part or entirely, by observation of features and identification of representations in the construction arrangement. The detailing may be guided by instructions based upon the factual features observed in the construction arrangement. These instructions greatly reduce or eliminate entirely the requirements for knowledge of fitting together of detail planning elements on the part of the person performing the detailing.

An observable feature useful in detailing as described immediately above is "location association." The term "location association" means the conveyance of an association between base reference lines and representation association lines or reference standard detail reference lines.

It is noted that when representations have construction details as a part of the representation, information for fabrication is conveyed by the representation.

Since time immemorial, building structures have been constructed in accordance with drawings which have been either scaled to size or, more commonly, provided with dimensions.

Most people outside the construction industry have grave difficulty envisioning the arrangement and appearance of a building, on the basis of drawings.

In practice, in custom-made building structures, the future occupant describes his wants in terms of appearance or function or both, to an architect or engineer, who then designs the structure in general terms, within the limits of cost, space, or other restrictions. The architect or engineer sketches a plan which is intended chiefly to show the relationship among primary planning elements. The plan of the architect or engineer generally has very few dimensions, which convey only overall distances.

The prospective occupant then generally reviews the plan, which may include perspective views, scaling and shading, and to the extent that he can understand the plans and envision the structure either approves or suggests changes.

Next plans are developed which contain sufficient dimensions to convey to experienced contractors and construction persons the distances of the primary planning elements relative to each other.

Concurrently or subsequently, sectional views and the like, peculiar to the plan, are developed, which are dimensioned to convey the measurements or distances required for fabrication or location of the individual pieces or parts which must be fastened together to produce the structure. Generally, the number of such drawings is held to a minimum, which necessitates skill in interpretation by the person using the drawings.

In some instances, detail and erection drawings are made, particularly if the materials used in the construction require other than simple hand tools for fabrication and assembling.

On the basis of the drawings, the quantities of materials required for the construction are determined and ordered.

Finally, the materials and the locations of the elements are measured and fabricated and the elements assembled.

Much actual construction work is done without any formal plans by men with experience in their particular fields. Thus, the carpenters building a house frequently frame the exterior walls of the house to fit the foundation plan, and frame the interior without any specific directions as to placement of the floor joists, the pieces making up the subfloor, the plates and studs, and even the rafters. Frequently, as a result, the plumbers, electricians and sheet metal workers find it necessary to cutout sections, or to run pipes, ducts and wires around in an awkward arrangement.

If the future occupant discovers, at any stage in the proceedings, that some part of the plan does not suit him, it is difficult and expensive to make changes. Furthermore, as has been suggested above, it is extremely difficult for one who has little experience, to estimate material requirements, the amount of labor involved and the proper scheduling of work and materials.

One of the objects is to provide a process for building planning which combines flexibility of arrangement with standardization of distances, pieces and assemblies which are required for construction.

Another object is to provide a model which conveys more information than conventional drawings.

Another object is to provide such a model which conveys relationships and appearance to greater effect than conventional drawings.

Still another object is to provide a process of general planning of construction which conveys information in terms which are assimilable by digital computers.

Still another object is to provide model pieces which are reusable, simple to use, stable in use, and which convey not only appearance but construction information.

Still another object is to provide means for portraying exterior appearance of buildings in projective relation to an interior model.

Still another object is to provide a process for general planning and detailing which does not require the making of drawings.

Still another object is to provide more direct measurement information than is provided by conventional drawings.

Still another object is to provide model pieces which may be used to construct stable models of different sizes and arrangement and appearance for amusement and education without conveyance of construction information.

Other objects will become apparent to those skilled in the art in the light of the following description and accompanying drawings.

SUMMARY OF THE INVENTION

In accordance with this invention generally stated, information relevant to proposed construction is conveyed by means of primary planning element representations on a base having uniformly spaced reference lines. The representations are removably mounted in unambiguous relation to the reference lines. At least some of these representations are model pieces provided with a plurality of pegs projecting from an edge. The base is provided with a multiplicity of holes of a size and depth complimentary to the pegs, consistently positioned with respect to and spaced along the reference lines.

Preferably, the reference lines form a rectilinear grid, and panels are provided along edges of the base for mounting model pieces of external facing element representations of a building on a scale with primary planning element representations on the base and in projective relation to them.

Also, preferably, mensuration strips which may be movable are mounted on the base in direct identifying relation to particularly identified lines on the base.

Means, in the form of saddle-shaped opening designations are provided removably mounted on exterior wall and partition wall segment model pieces and provided with location indicia in unambiguous relation to the reference lines.

Fixtures representations are preferably provided with location indicia in unambiguous relation to reference lines.

Indicia of reference standard details relating to particular representations are mounted in unambiguous relation to reference lines and to the particular representation to which it relates.

The base, planning element representations, mensuration strips and indicia of reference standard details are such that the assemblage can be photographed, and the resulting photograph can convey all of the information or direct reference to all of the information required for the construction of a building.

The mensuration strips, reference lines and indicia are such as to provide information in a manner directly assimilable by a digital computer.

As an alternative to mounting indicia of reference standard details, construction details are made a part of planning element representations.

Also to achieve assembly of building models with no intent to convey information on proposed construction, a flat pattern, conveying suitable identification of model pieces is placed in registration with holes in a base and model pieces with pegs are mounted on the base, the pegs penetrating the flat pattern.

BRIEF DESCRIPTION OF THE DRAWINGS

In the drawings,

FIG. 2 is a view in perspective of a model piece, in the form of a segment of an exterior wall, mounted on a base;

FIG. 3 is a view in perspective of another model piece in the form of a corner in an exterior wall, mounted on a base;

FIG. 4 is a view in perspective of a model piece in the form of a reentrant corner, mounted in unambiguous relation to reference lines on the base;

FIG. 5 is a fragmentary detail view of the lower part of the model piece shown in FIG. 2, showing projecting pegs;

FIG. 6 is a sectional view taken along the line 6 of FIG. 5;

FIG. 7 is a fragmentary view in perspective of a model piece in the form of a segment of an exterior wall, adapted to receive a vertical extension piece;

FIG. 8 is a sectional view taken along the line 8—8 of FIG. 7;

FIG. 9 is a fragmentary view in perspective showing model pieces in the form of exterior wall segments on one of which a model piece in the form of a saddle-shaped opening designation is mounted;

FIG. 10 is a view in perspective of the saddle-shaped opening designation shown in FIG. 9;

FIG. 11 is a fragmentary sectional view taken along the line 11 of FIG. 10;

FIG. 12 is a view in perspective of a model piece in the form of partition or interior wall segment, mounted on a base;

FIG. 13 is a bottom plan view of the partition piece shown in FIG. 12;

FIG. 14 is a sectional view taken along the line 14—14 of FIG. 13;

FIG. 15 is a sectional view taken along the line 15—15 of FIG. 13;

FIG. 16 is a sectional view corresponding to that shown in FIGS. 14 and 15 showing an alternative means for mounting the piece shown in FIGS. 12 and 13;

FIG. 17A is a view in perspective of one embodiment of a model piece in the form of a closet;

FIG. 17B is a view in perspective of a model piece in the form of a closet intended for use with the piece shown in FIG. 17A;

FIG. 18 is still another embodiment of a model piece in the form of a closet;

FIG. 19 is a view in perspective of a model piece conveying the swing of a door in a partition, mounted on a partition model piece;

FIG. 20 is a bottom plan view of the door piece shown in FIG. 19;

FIG. 21 is a sectional view taken along the line 21—21 of FIG. 20;

FIG. 22 is a view in perspective of a saddle-shaped opening designation piece for a partition model piece;

FIG. 23 is a fragmentary view in perspective showing saddle-shaped opening designation pieces in telescopic relation, mounted on a partition model piece which is mounted on a base;

FIG. 23A is a fragmentary view in perspective of model pieces in the form of exterior wall segments or partition segments mounted on a base having a different arrangement of holes and peg positions from the embodiment shown in FIGS. 1 and 2;

FIG. 23B is a sectional view taken along line 23B of FIG. 23A;

FIG. 38 is a fragmentary plan view, partly broken away, showing wallpieces mounted on the panel shown in FIG. 29, illustrating an exterior wall of a two-story house;

FIG. 39 is a view corresponding to that shown in FIG. 38, illustrating an exterior wall of a house with three levels;

FIG. 40 is a fragmentary view in perspective of facing element model pieces for use in conveying interior appearance;

FIG. 51 is a reference standard detail drawing of a planning element interface which is framing of a window opening in a wall;

FIG. 52 is a reference standard detail drawing of a standard component which includes a window framing of a wall;

FIG. 53 is a reference standard detail drawing of a standard component which includes a window in a wall;

FIG. 54 is a reference standard detail drawing of a planning element interface which is drainage piping and a partition;

DESCRIPTION OF THE PREFERRED EMBODIMENTS

Figure 1:
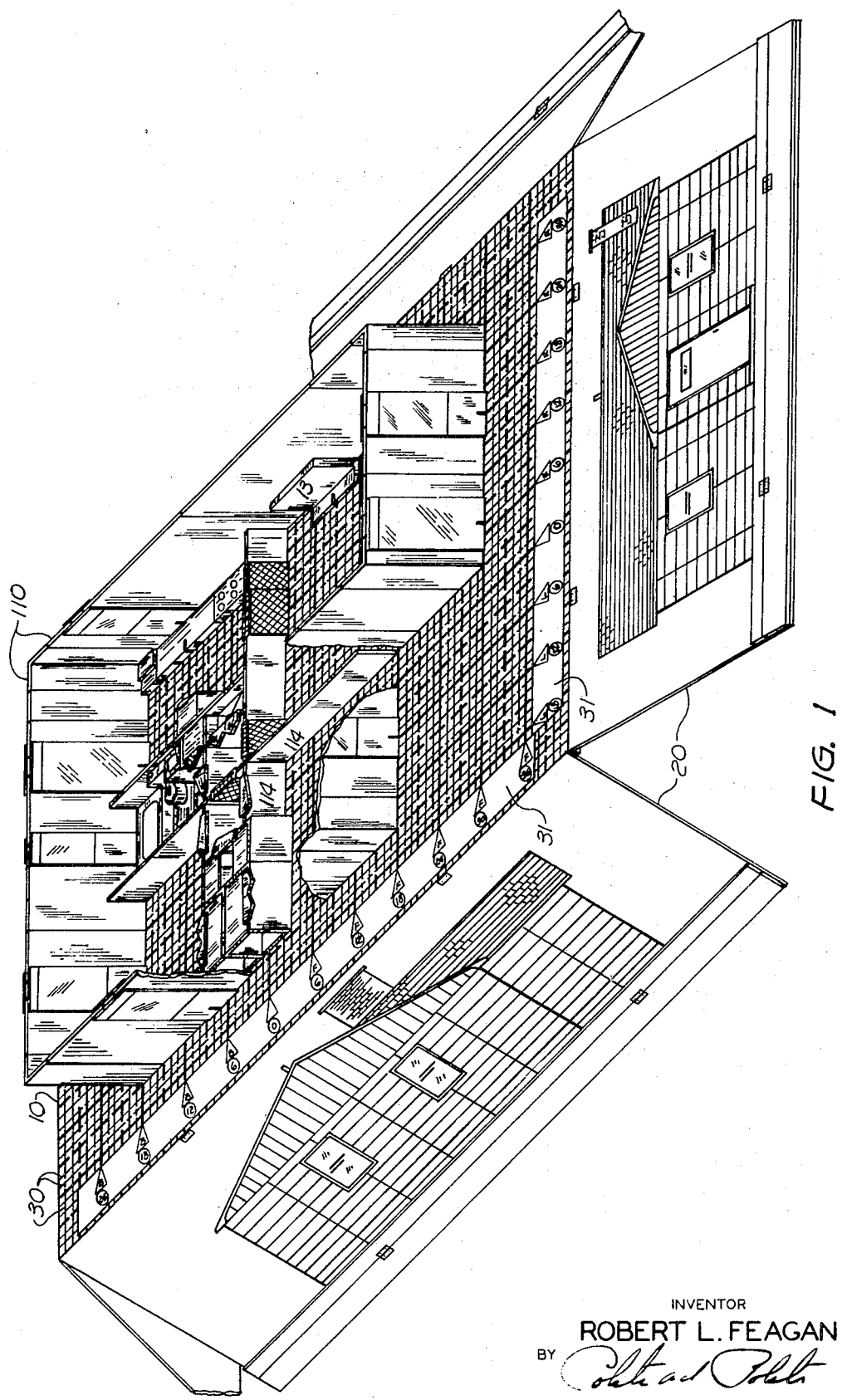
FIG. 1 is a fragmentary view in perspective partly broken away, of one embodiment of base, model assembly and elevation panels illustrating this invention.
Figure 41:
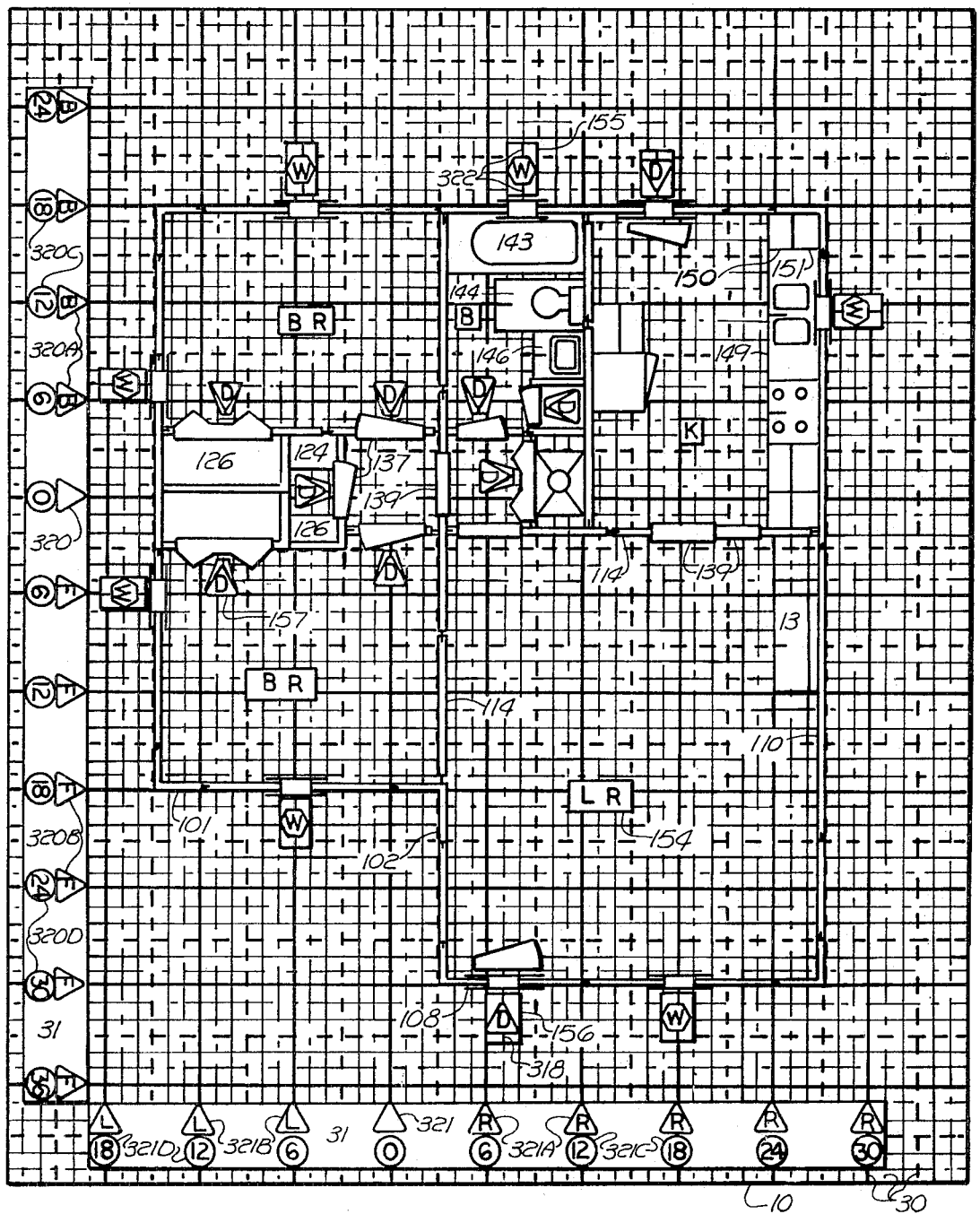
FIG. 41 is a top plan view of the base and model of FIG. 1 wherein suitable identification of some of the primary planning element representations has been accomplished by addition of indicia of reference standard details.
Figure 42:
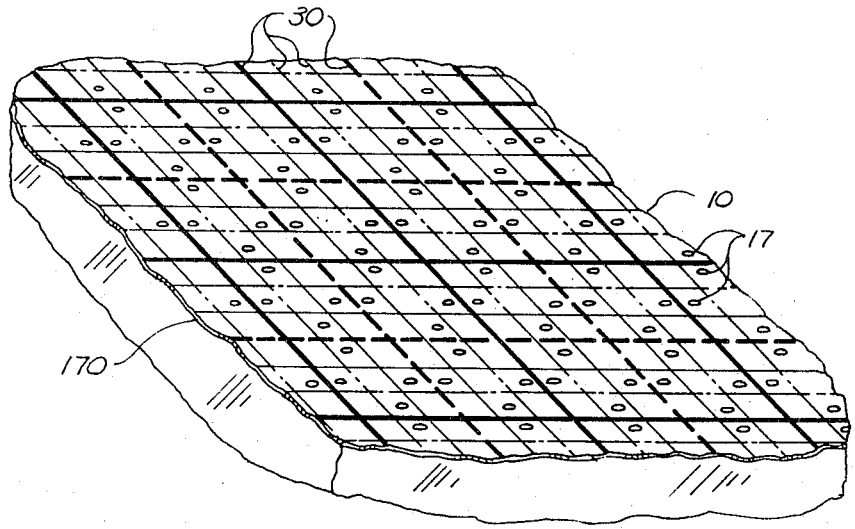
FIG. 42 is a fragmentary view in perspective of a base showing examples of various reference lines.

Referring now to the drawings for illustrative embodiments of information-conveying apparatus of this invention, and particularly to FIGS. 1, 41 and 42, a base 10 mounted on a pedestal or legs, not here shown, is provided with reference lines 30, which, in this embodiment, are in the form of a rectangular grid, and with holes 17 which are symmetrically positioned about and along reference lines 30. In this embodiment, the holes 17 are adjacent but not on lines 30.

Also, in this embodiment, mensuartion strips 31 are provided, which extend along and adjacent two edges of the base, at right angles to one another. The mensuration strips 31 carry reference symbols 320 and 321, direction symbols 320A and 320B, and 321A and 321B, respectively, and numerals 320C and 320D and 321C and 321D, respectively. The direction symbols are in the form of triangular indicia, the apices of which coincide with heavy solid lines of the reference lines 30. Within each of the triangular areas of the direction symbols 320A is the letter "B," which signifies "Back." In each of the triangular areas of the direction symbols 320B is the letter "F," which signifies "Front." In each of the triangular areas of the direction symbols 321A is the letter "R," which signifies "Right." In each of the triangular areas of the direction symbols 321B is the letter "L," which signifies "Left." The numerals 320C, 320D, 321C and 321D are enclosed within circles contiguous the center of the base opposite the apex of each of the direction symbols.

In the embodiment shown in FIGS. 1, 41 and 42, one reference symbol 320 and one reference symbol 321 has no letter in its triangular area, and has the number zero in its numeral circle. These designate zero reference lines on the base grid. The numerals in this embodiment indicate regular multiples of space units reckoned from the zero reference lines. In the illustrative embodiment, these space units are represented by reference lines of different character from the heavy solid lines associated with the direction symbols.

It will be observed that in the illustrative embodiment shown in FIGS. 1 and 41, the number of reference symbols on the mensuration strips on one side of each zero reference line is different from that on the other side. The mensuration strips can be made with the same numbers of reference symbols on each side of the zero reference line, or the zero reference line may be placed at one end of the strip. The zero reference may even be eliminated, but under most conditions this is undesirable.

The mensuration strips can be and preferably are mountable and demountable, to accommodate different arrangements of planning element representations as will be explained.

Model pieces are mounted on the base 10 to provide a model, in this illustrative embodiment, of a residential type structure. These model pieces include exterior wall pieces which, in the aggregate produce an exterior wall 110, partition model pieces which, assembled, produce partitions 114, a fireplace piece 13, and various sink, bathroom fixture pieces and closet pieces, all of which will be described in greater detail hereinafter.

Hingedly mounted on the edges of the base 10 are panels 20 on which exterior appearance model pieces are mounted to construct a likeness of the elevations of the model on the base 10.

Referring now to FIGS. 2 through 7 for illustrative examples of model pieces useful in making up an exterior wall, reference numeral 11 indicates one type of exterior wall piece. The piece 11 is rectangular in elevation, with a tongue 15 along one long edge and a complementary groove 16 along the opposite long edge. Pegs 103, centered transversely, project from a short edge of the piece 11. The pegs 103 are spaced apart on exactly the same spacing as consecutive holes 17 are spaced along the reference lines of the base. The pieces 2 through 7 span only two holes in any one reach. It can be seen that if a piece spans more than two holes 17, only two pegs will ordinarily be needed, spaced an integral multiple of the spacing of consecutive holes. The length of the pegs 103 is such as to permit them to be received entirely within the holes 17, and to mount the piece 11 solidly but easily manually demountably on the base. The thickness of the piece 11 is such, in this embodiment, and the offset of the holes 17 from the lines along which they extend is such that, when the piece 11 is mounted on the base, an arris of a short edge of the piece lies along and touching a reference line. That arris constitutes an association line 32. In FIGS. 2, 5 and 6 this relation is shown clearly, the association line 32 coinciding with a specific reference line 33 on the base 10. The specific reference line 33, of course, bears a unique relation to the reference symbols, direction symbols and numerals. Thus, the exterior wallpiece 11 as shown in FIG. 2 bears an unambiguous relation to the specific reference line 33 and to every other reference line on the base.

In FIG. 3, an exterior wall corner model piece 101 has two association lines, 32 and 32A, at right angles to one another. The piece 101 is so proportioned that the association line 32 touches a specific reference line 33 while the association line 32A touches and extends along a reference line 33A perpendicular to the reference line 33.

In FIG. 4 a reentrant wall corner model piece 102 is shown with its inside lower arrises serving as association lines 32 and arises It will be observed that the length of the association line 32 is an integral multiple of space units.

In FIGS. 7 and 8, a model piece 11A is shown provided with a groove 105 along its top edge to accommodate a height extension piece 104. The height extension piece 104 can be of any desired height, and is provided along its upper and lower edges with grooves 105. A spline 106 seated in the corresponding grooves 105 in the piece 11A and the height extension piece 104, provides a stable mounting for the height extension piece 104.

Referring now to FIGS. 9 through 11, a saddle-shaped opening piece 108 is made up of facing panels 111 joined by a U-shaped wall clip piece 110. The particular embodiment of saddle-shaped opening piece 108 shown in FIGS. 9-11 is intended to represent a window opening, and to that end, upper and lower boundary defining panels 112 are fastened to the outside faces of the facing panels 111. The lower boundary defining panel 112 has at its center lengthwise of the piece a vertical association line 34. The height of the facing panels 111 is such as to let the saddle-shaped piece clear the base when it is mounted, but to come close to the base so that the association line 34 is in unambiguous relation to specific base reference lines on the base. The association line 34 can either be immediately contiguous a particular reference line, or it can lie between two reference lines. In FIG. 9, for example, the association line 34 lies midway between reference lines 35A and 35B.

Referring now to FIGS. 12 through 16, a partition piece 107, making up a part of partition 114, is shown as being mounted on the base 10 in unambiguous relation to a specific reference line 37. The arris along a long edge of the piece 107 constitutes an association line 36, which touches the line 37. The partition piece 107 is similar to but not identical with the exterior wallpiece 11. It is preferably, and in this embodiment is in fact not as high as the exterior wallpiece, and while it is provided with a groove 117 at one end and a tongue 118 at the other end, the tongue 118 is relatively long and the groove 117 relatively deep as compared with the tongue and groove of the exterior wallpiece. The partition piece 107 in this embodiment, is mounted on the base 10 by means of a plastic material which has sufficient adhesion to insure that the partitions will remain where they are put, but not enough to prevent their being manually removed. In order to keep the plastic on the partition piece, it is necessary to provide a greater surface along the lower edge of the partition piece than the corresponding surface of the base. In FIG. 14 a channel 120, with adjacent flat surfaces 121 is formed in the bottom surface. In FIG. 15 a hole 122 is shown as being drilled to accommodate plastic 119. FIG. 16 illustrates an alternative method, in which magnets 123 are secured to the bottom of the partition piece, and the base is made of magnetic material.

The relatively long tongue and deep groove of the partition piece permits linear adjustment of the partition pieces forming a partition 114. As will be explained hereinafter, it is desirable to fix the length of the exterior wallpieces exactly, whereas for interior partitions it is not necessary to do so. In order to facilitate the variations in length, the peg system of mounting is not used in connection with the mounting of the partition pieces in the embodiment just described. However, as is illustrated in FIG. 23A, a peg system can be used.

FIGS. 17A, 17B and 18 illustrate various forms of closet pieces, each of which has a closet partition piece 125 and spaced parallel upper and lower brace pieces 129. The brace pieces 129 are square-ended and rectangular. Edges 134 and 135 are adapted to be placed in contact with either an exterior wall 110 or partition 114. In FIGS. 17B and 18, partition pieces 128 extend perpendicularly to partition pieces 125, closing one side of the space defined between the brace pieces 129. Extensions of association lines 36A, 36B, 36C and 36D are shown in FIGS. 17A-18 to indicate the points or arises serving as association lines.

The width of pieces 128 and 129 is related to the space unit of the grid, the thickness of the partition pieces 107, and the thickness of exterior wallpieces 11, so as to produce an unambiguous relation between association lines 36A-36C and specific base reference lines when the closet pieces are placed as described hereinafter.

Referring now to FIGS. 19, 20 and 21, a model door piece 137, bearing identification 138 is, in this embodiment, equipped with small wads of adhesive 119, seated in recesses 122, by which the model door piece may be mounted removably on a partition or exterior wall. In the embodiment shown, the model door piece 137 is shown being mounted on a partition. In FIG. 22 an inverted U-shaped model partition opening piece 139 has a height slightly less than the height of model partition pieces 107. The distance between the legs of the piece 139 is slightly greater than the thickness of the model partition pieces 107, so that the pieces 139 can be readily mounted and demounted. In FIG. 23, a telescoping partition opening piece 139' is shown mounted on a partition 114 over the top of a part of a partition opening piece 139. With such an arrangement, or with alternate pieces 139 and 139', the size of the opening represented can be varied easily. The vertical edges marking the outer limits of the telescoped model partition opening pieces serve as association lines 38 which are shown as being placed in unambiguous relation to specific base reference lines 37 of the base 10.

In FIG. 23A a partition arrangement is shown in which a peg mounting is employed. A base 190 has evenly spaced reference lines 360. Holes 197, in this embodiment of base, are located midway between reference lines 360. Pieces 192A, 192B and 192C are pieces which may be used to construct model partitions, model exterior walls or even a base perpendicular to the base 190. FIG. 23B shows a detailed view of the peg area employed with this embodiment of base and planning element representation, in this case a partition piece.

The partition piece has a width one-half of the spacing of the reference lines 360, and pegs 194 are so constructed that the side on which the pegs are mounted is on a line through centers of the holes 197 and the opposite side has its arris along the base along and touching a reference line 360. Because the holes 197 are relatively closely spaced along the reference lines, the length of a partition can be adjusted within one space unit's length. The base 190 can be used for mounting exterior walls and anything else for which the base 10 can be used.

FIGS. 24 through 28C represent various representations of primary planning elements in the nature of bathroom and kitchen fixtures.

Figure 24:
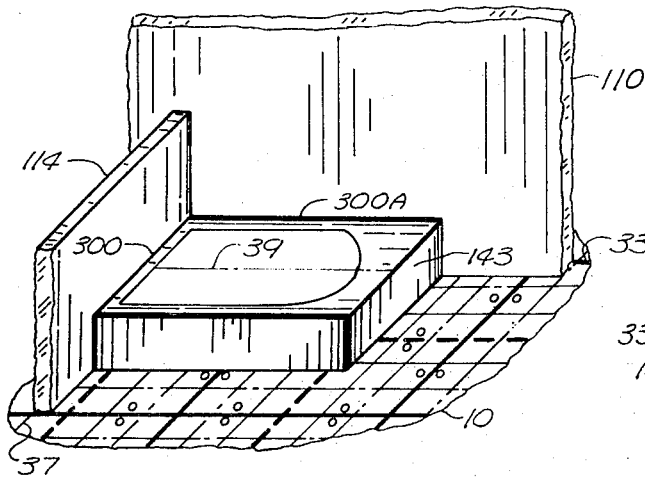
FIG. 24 is a view in perspective of a fixture model piece in the form of a bathtub, mounted on a base in relation to an exterior wall model piece and an interior partition model piece.

In FIG. 24, a bathtub model piece 143 is shown in contact with a model partition 114 and a model exterior wall 110 which have been mounted in unambiguous relation to specific base reference lines 37 and 33, respectively. The model bathtub piece has association lines 300 and 300A which are placed against pieces 110 and 114. The measurements relating the tub centerline 39 to specific base reference lines 33 and 37 will be conveyed by a reference standard detail, not here shown, the character and use of which will be described hereinafter.

Figure 25:
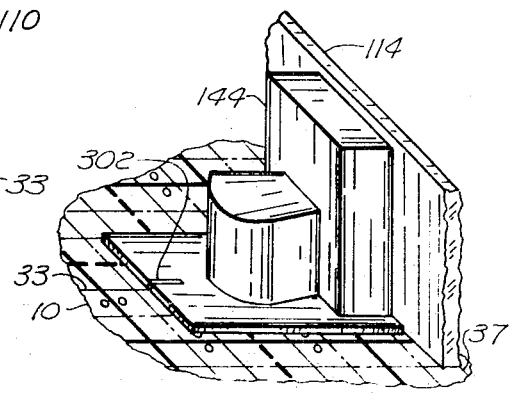
FIG. 25 is a fragmentary view in perspective showing a fixture model piece in the form of a toilet mounted on a base in relation to a partition model piece.

In FIG. 25 a toilet model piece 144 is shown as being placed in contact with a model partition 114 which has been mounted in unambiguous relation to a specific reference line 37 of base 10. The piece 144 is placed so that an association line 302 on the piece 144 is in unambiguous relation to a specific base reference line 33 of the base 10.

Figure 26:
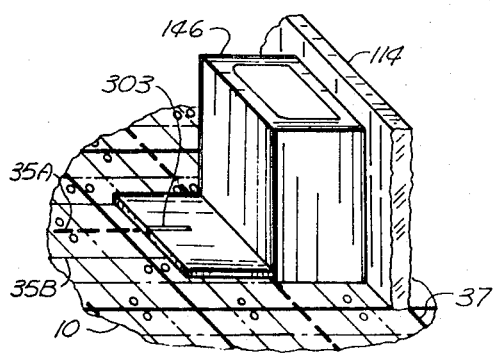
FIG. 26 is a fragmentary view in perspective of a model piece in the form of a washbasin mounted on a base in relation to a partition model piece.

In FIG. 26 a washbasin model piece 146 is shown as placed in contact with a model partition 114 which has been mounted in unambiguous relation to a specific base reference line 37 of base 10. Piece 146 is mounted so that an association line 303 on the piece 146 is in unambiguous relation to specific base reference lines 35A and 35B of base 10.

Figure 27:
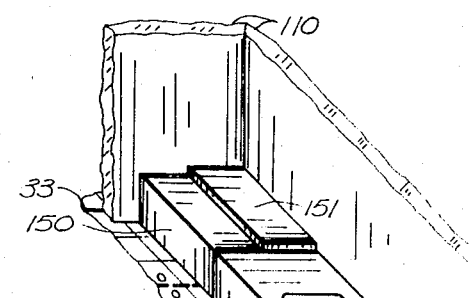
FIG. 27 is a fragmentary view in perspective of a fixture model piece in the form of a kitchen sink and cabinets mounted on a base in relation to exterior wall model pieces.

In FIG. 27, a sink model piece 149, a base cabinet model piece 150, and a wall cabinet model piece 151 are all shown as placed in contact with an inner surface of model exterior walls 110, which have been mounted in unambiguous relation to base reference lines 33 and 33A. Piece 149 is so mounted that association line 304 on piece 149 is in unambiguous relation to specific base reference lines 35A and 35B.

Figure 28:
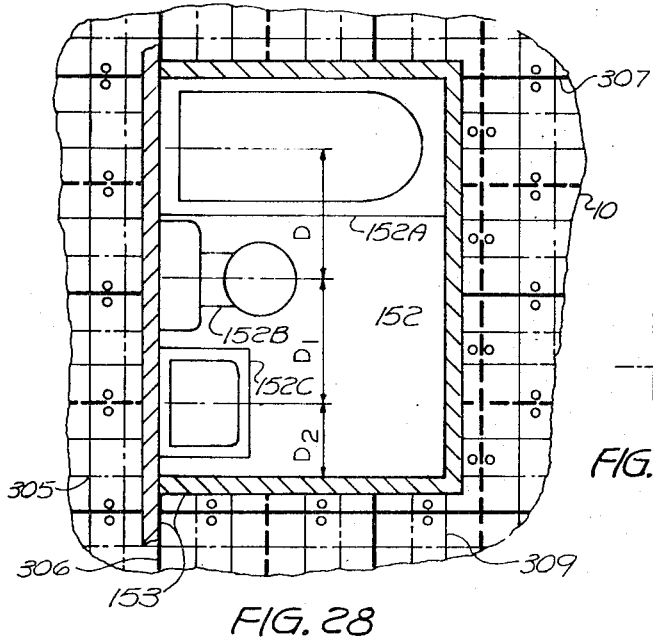
FIG. 28 is a fragmentary top plan view partly in section of a fixture model piece in the form of an arrangement of bathroom fixtures mounted as a unit on a base in one of four possible relations to partition and exterior wall model pieces.

FIG. 28 illustrates a way in which the present invention can be used for "packaged" fixture arrangements. A tub model piece 152A, toilet model piece 152B and washbasin model piece 152C are all mounted in turn upon a package piece representation 152, which defines the area of the bathroom, as well as the relative locations of the pieces. Representations 153 of exterior walls or partitions are shown as mounted in unambiguous relation to specific base reference lines 305, 306, 307 and 309. The various centerlines and dimensions will be conveyed by a reference standard detail, not here shown, the character and use of which will be described hereinafter.

Figures 28A, 28B, 28C:
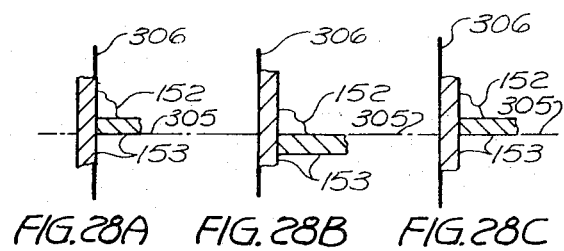
FIG. 28A is a fragmentary detail top plan view illustrating another position of the interface of elements shown in FIG. 28 with respect to reference lines on the base.
FIG. 28B is a fragmentary detail top plan view illustrating a third position of the interface of elements shown in FIG. 28 with respect to reference lines on the base.
FIG. 28C is a fragmentary detail top plan view illustrating the fourth possible position of the interface of elements shown in FIG. 28 with respect to references lines on the base.

FIGS. 28A, 28B and 28C illustrate the three possible placements of the representations 152 and 153 and base reference lines 305 and 306 alternate to the placement shown in FIG. 28. It will be noted that in FIG. 28A, the wall representation 153 parallel with the bottom sight line of the drawing is above the line 305, as distinguished from its position in FIG. 28, and the wall at right angles to the first wall is to the left of the line 306, as it is in FIG. 28. In FIG. 28B, the "parallel" wall representation 153 is below the reference line 305, as it is in FIG. 28, but the perpendicular wall is to the right of the reference line 306, as distinguished from its position in FIG. 28. In FIG. 28C, the parallel wall 153 is above the reference line 305, while the perpendicular wall 153 is to the right of the reference line 306, both as distinguished from positions in FIG. 28.

It can be seen that with a different arrangement either of holes or of the placement of the pegs with respect to the pieces to which they are connected, the model pieces could be positioned on and in centered relation to the reference lines of the base, and that for many purposes such an arrangement would be simpler than the arrangements shown and described. The present arrangements, in which planning element pieces are placed with edges, constituting association lines, along and contiguous but not athwart the reference lines, is consistent with what is now considered to be the best construction practice in conventional wood framing. In such practice, measurement is made to and from a face, e.g., from outside a face to outside face of studs in the frame of a wall.

FIGS. 29 through 40 illustrate planning element model pieces of a different sort from those of FIGS. 2 through 28, for use on the hinged panels 20. These pieces are exterior appearance model pieces and are preferably mounted in direct elevational relation to model pieces on the base 10.

Figures 29, 30:
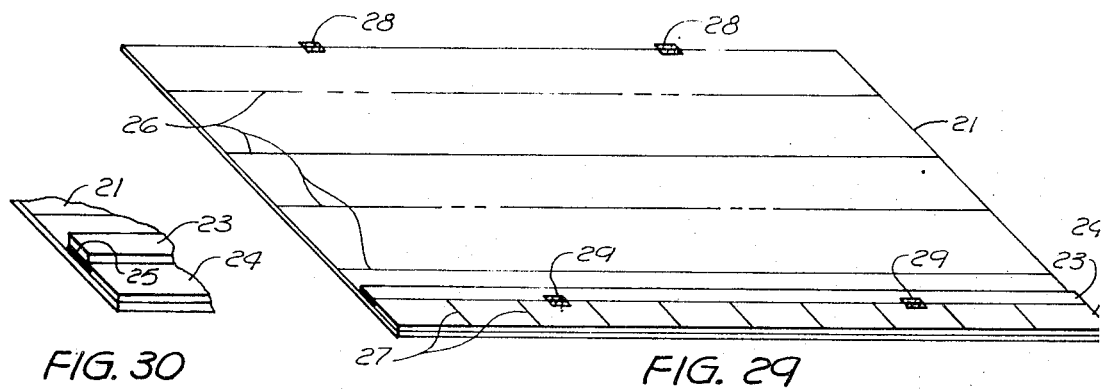
FIG. 29 is a view in perspective partly broken out, of a hinge mounted panel of the character shown in FIG. 1, without facing element model pieces mounted on it.
FIG. 30 is a fragmentary view in perspective showing a detail of the panel in FIG. 29.

Referring now to FIG. 29, a panel board 21 is connected by hinges 28 to the base 10. A support piece 24 is secured to and along an outer edge of the panel board. A ground line strip 23 is hingedly attached to the support piece 24 by means of hinges 29. In the embodiment shown, the inner face of the support piece 24 is rabbeted to form an open channel 25, the mouth of which faces in the direction of the base 10.

Parallel horizontal guide lines 26 are provided on the panel board, and parallel vertical guide lines 27 are provided on the support piece 24. In FIG. 29 the ground strip 23 is shown as rotated to a position in which it overlies the panel board 21 between the support piece 24 and the base 10. In FIG. 30 the strip 23 is shown as rotated through 180° to a position at which the strip overlies the support piece 24.

Figures 31, 32:
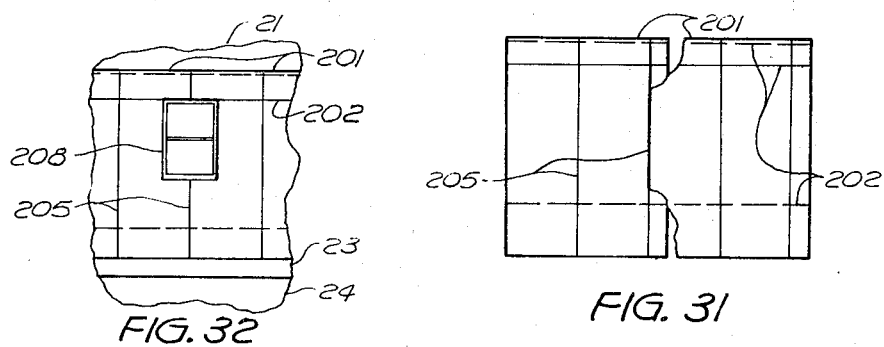
FIG. 31 is a top plan view, partly broken away, showing facing model pieces in the form of exterior wall surfaces.
FIG. 32 is a fragmentary top plan view of the model pieces shown in FIG. 31 with the addition of a window piece, mounted on the panel shown in FIG. 29.

In FIG. 31 wall elevation pieces 201 are shown. These can be made of heavy construction paper or other suitable material such as plastic. They are provided on one surface with an exterior wall finish, in the embodiment shown, in the form of a representation of siding, as shown particularly in FIGS. 33-37, and on the same or on the opposite side with horizontal guide lines 202 and vertical guide lines 205. In FIGS. 31 and 32 the representation of the siding is omitted for clarity. The representation can, of course, be of brick, stone, stucco, butt and batten, or any other texture or appearance which is to be used. In FIG. 31, two exterior wall appearance pieces 201 are shown overlapping along a vertical edge. In FIG. 32, a window appearance elevation piece 208 is shown mounted on the outside surface of the pieces 201 of FIG. 31, the entire assembly in turn mounted on the panel board 21 by putting the lower part of the pieces 201 in the slot 25 of the support piece 24. The window piece 208 is mounted on the pieces 201 by means of an adhesive which permits its removal. Suitable adhesives are well known, an example being sold under the trademark "Holdit," a product of Eberhard Faber Company.

Figures 33, 34:
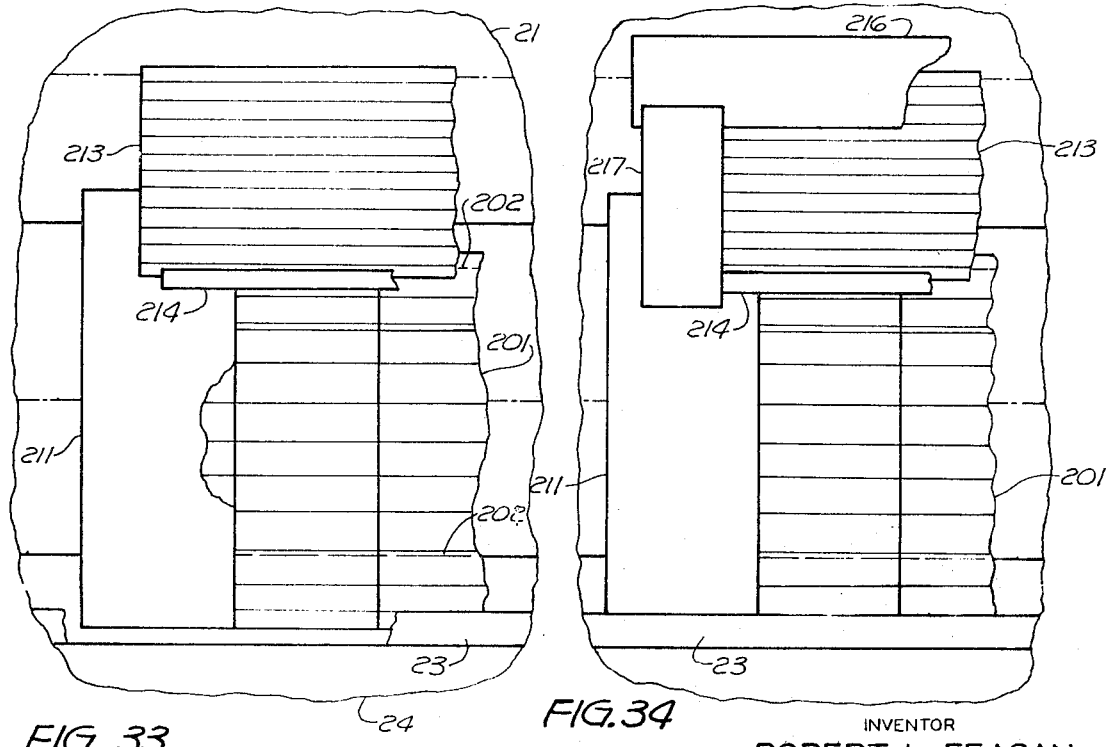
FIG. 33 is a fragmentary view in plan, partly broken away, of various external facing model pieces mounted on the panel shown in FIG. 29.
FIG. 34 is a fragmentary view in plan, partly broken away, showing a further development of the mounting of the pieces shown in FIG. 33.

In FIG. 33, an end cutoff piece 211 is mounted over one end of wall appearance pieces 201 mounted on the panel board 21 and a roof texture piece 213 is mounted over the top edge of pieces 201. A fascia piece 214 is mounted along the lower edge of the roof textured piece, over pieces 201 and 213.

In FIG. 34, a roof top cutoff piece 216 is mounted over the top of roof texture piece 213 to define the upper edge of the roof of the structure, and roof end cutoff piece 217 is mounted over the ends of pieces 213 and 214.

The cutoff pieces are all of uniform background color so as to be unobtrusive.

Figure 35:
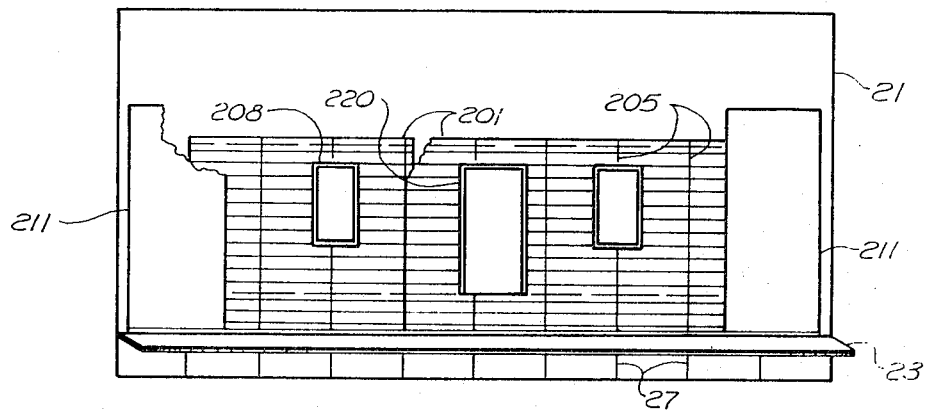
FIG. 35 is a plan view partly broken away of the panel of FIG. 29, showing an early step in the development of a front elevation of a residence.

FIG. 35 is a view of the full panel board 21 in the condition between the steps described in FIGS. 32 and 33, with the exterior wall appearance pieces 201 and the exterior wall end cutoff pieces 211 in position, but without the roof texture piece. As can be seen, in this view, two window elevation pieces 208 have been mounted, and a door elevation piece 220.

Figure 36:
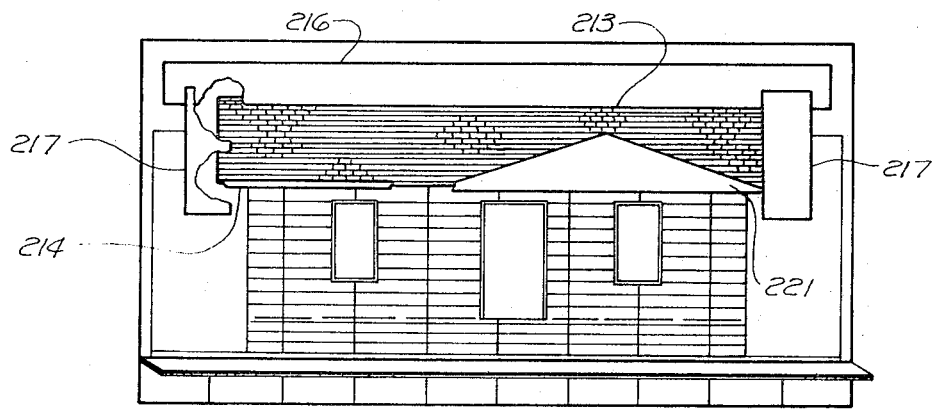
FIG. 36 is a view corresponding to the view shown in FIG. 35, showing a subsequent step.

FIG. 36 illustrates, on the full panel board, the condition described in connection with FIG. 34, with the roof texture piece 213 in place and the roof top and end cutoff pieces in place. A gable piece 221 has also been mounted.

Figure 37:
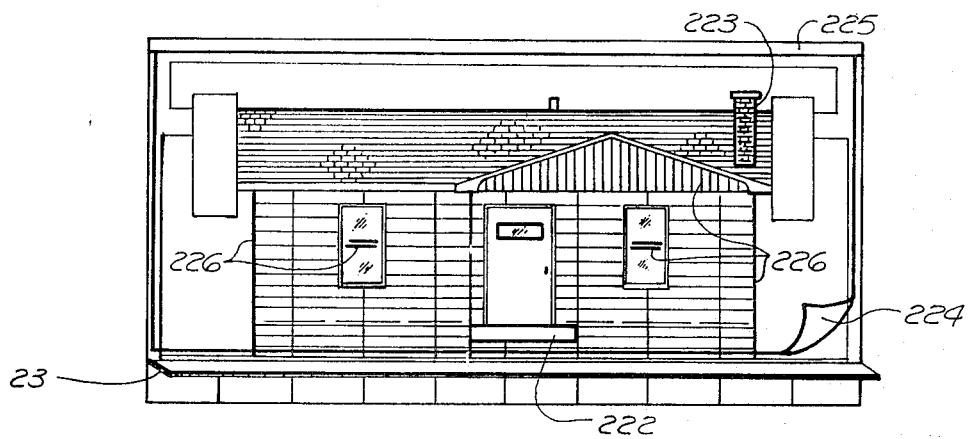
FIG. 37 is a view corresponding to the view shown in FIGS. 35 and 36 showing a completed front elevation.

In FIG. 37, the exterior representation model has been completed. A chimney piece 223 has been mounted, as has been a vent stack and a step piece 222. A transparent overlay 224 of cellulose acetate or similar material is attached at its top edge to the panel board 21 by an attachment strip 225. Accent marks 226, made with felt tip markers or the like, which can be washed off with water or other suitable solvent, are made on the outside surface of the transparent overlay to provide minor "customized" details. The ground strip 23 is shown as being hinged down. When the overlay 224 is laid flat, the strip 23 is turned to its overlying position, which, in this embodiment, would delineate the ground level along the lower edge of the piece 222.

In FIGS. 38 and 39, a plurality of exterior wall appearance pieces 201 are mounted in both vertical and horizontal overlapping relation. In FIG. 38, the wallpieces 201 are two deep vertically, whereas in FIG. 39, they are three deep. It can be seen that the rather deep channel 25 permits considerable flexibility, using standard exterior wall appearance pieces. Thus, the lowermost of the pieces 201 in FIG. 39 could represent a foundation wall projecting above the ground level, the intermediate piece 201 could represent a brick section, and the uppermost piece 201, stucco or weatherboard. In any case, the horizontal and vertical guide lines provide an easy means for achieving alignment and appropriate scale relation.

In FIG. 40, an appearance piece of a different sort is shown. In this figure, an interior wall finish piece 232 is adapted to be removably attached to model exterior walls 110 or model partition 114. A clip 229 and flange 231 are provided for engagement of exterior wall or model partition pieces. The height of the clip 229 from the flange 231 is appropriately related to the height of the exterior wall and partition pieces, respectively. In the same figure, a fragment of a floor finish appearance piece 228 is shown.

Referring now to FIG. 41, which is a plan view of FIG. 1, planning element model pieces are shown as mounted on a base to produce a full model, conveying not only appearance but measurement of one floor of a home. Exterior wallpieces 11, together with five wall corner model pieces 101 and one reentrant wall corner model piece 102 form an exterior wall 110, extending from reference line B18 to F18 along a line L15; from L15 to R3 along the reference line F18; from reference line F18 to F30 along the line R3; from R3 to R27 along the line F30; from F30 to B18 along the line R27; and from R27 to L15 along the line B18.

Saddle-shaped opening pieces 108 on the exterior wall 110 mark the windows and doors. The location of these openings, as well as their character, are marked by indicia markers 155 and 156 of reference standard details. The markers 155, which indicate windows, each has an index line 322 and the markers 156, which indicate doors, each has an index line 318. The index lines 322 and 318 are placed in unambiguous relation to specific reference lines of the base.

Descriptive markers 154 may be mounted on the base, merely for convenience, to indicate the nature of the rooms or like information which, however, has no significance as far as the construction of the house is concerned.

Partition pieces 107 make up partitions 114 which, in the illustrative embodiment shown, lie immediately along and in unambiguous relation to particular base reference lines. Opening pieces 139 mark, in the embodiment shown, doorways in the partitions. Door pieces 137, mounted on the partitions in those openings in which doors are to be mounted, indicate the direction of mounting and the direction of swing of the doors. Similar pieces are mounted on the base adjacent door openings in the exterior wall.

Closet pieces 124 and 126 mark the location of closets. Doors for both the partition openings and the closets are shown as both located and characterized by indicia markers 157 of reference standard details. The markers 157 are shown some with an index line on a reference line and others between reference lines, but in either case, in unambiguous relation to base reference lines. Fixture pieces 143, 144, 146, 149, 150, and 151 mark bathtub, toilet, wash basin, sink, base cabinet and wall cabinet, respectively, all placed by virtue of their association lines in unambiguous relation to discrete reference lines on the base, hence to every other representation of a planning element of the model which is a construction arrangement. Fireplace piece 13 is similarly placed in unambiguous relation to an exterior wall and to reference line F9.

FIG. 42 shows in somewhat more detail the character of the reference lines and the placement of holes 17 with respect to them. The base in this particular embodiment includes a metal facing 170, preferably a magnetic material, and an underlying table of substantial thickness to permit the holes 17 to be of sufficient depth to insure a firm mounting of the exterior wallpieces.

Figure 43:
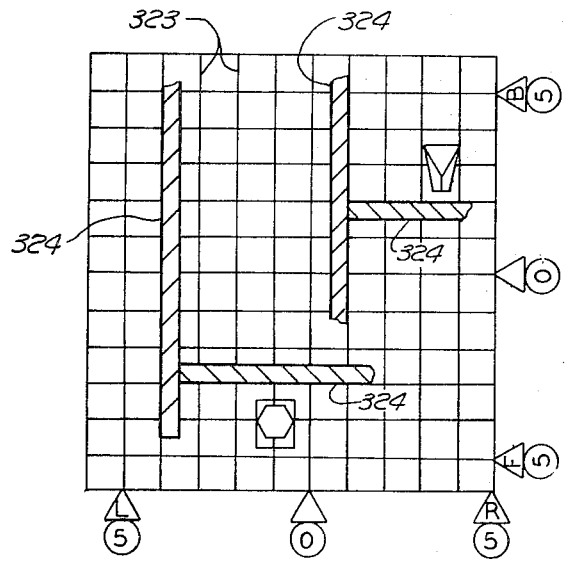
FIG. 43 is a fragmentary detail plan view showing the placement of wall and partition pieces with respect to reference lines in the same relation as wall and partition model pieces are shown in FIG. 41.
Figure 44:
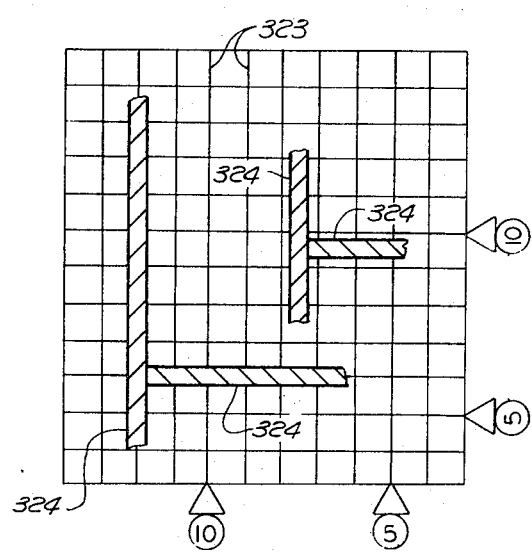
FIG. 44 is a view corresponding to the one shown in FIG. 43, but showing an alternative placement of wall and partition pieces in unambiguous relation with respect to reference lines.

FIGS. 43 and 44 illustrate two different methods of placement of wall representations with respect to grid lines. In FIG. 43, wall or partition representations 324 are mounted with an arris constituting an association line immediately contiguous a reference line 323. It will be observed that the association line may be along either bottom arris, but in either case, a measurement between parallel wall pieces from reference lines with which they are mounted in unambiguous relation, will represent measurements from one exterior face to another exterior face. Whether the association line does in fact mark the exterior face of the wall or partition depends upon the way in which the reference standard details are used, but in any event, they represent a usable reference point. For example, the association line may mark the position of faces of studs or a plate in the framing of a wall, rather than the finished exterior or interior edge, because the position of the studs or plate or preassembled section of studs, plate and header is the essential information to be conveyed to the builder.

In FIG. 44, the walls, or more properly, partitions 324 are shown as mounted directly upon or halfway between reference lines. This arrangement has certain advantages in simplicity, the measurements being made from center to center of the walls, there being no need for a designation as to which side of the reference line the partition is located.

Figure 45:
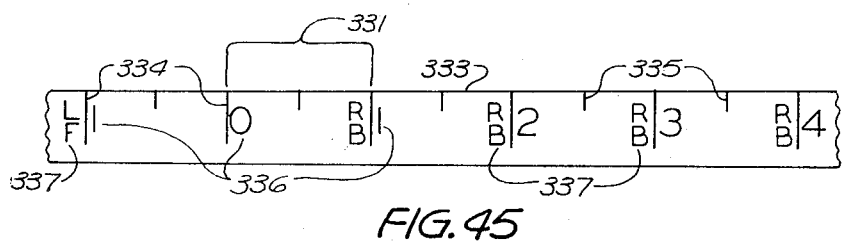
FIG. 45 is a fragmentary top plan view of a measuring device with markings and divisions consistent with the reference lines of the base shown in FIGS. 1 and 41.

FIG. 45 illustrates a scale or tape 333 which may advantageously be used in translating the information conveyed by the model piece representations into actual construction. The tape 333 has on it unit scale marks 334 and half-unit scale marks 335, identification numbers 336 and letter identification indicia 337. The scale marks 336 are uniformly spaced, as are the reference lines 30 and reference symbols 320 and 321, so that whatever their spacing, the unit marks and half-unit marks bear a direct relationship to the reference lines and reference symbols. As an example of a particularly desirable scale arrangement, the unit scale marks 334 may be spaced 8 inches apart, the half-unit marks being midway between each successive pair of unit marks. This scale, in which each successive identification number represents an 8 inch increment, is adapted to conventional construction, where 12 inches, 16 inches, and 24 inches, and integral multiples of those distances, are commonly employed.

Figure 46:
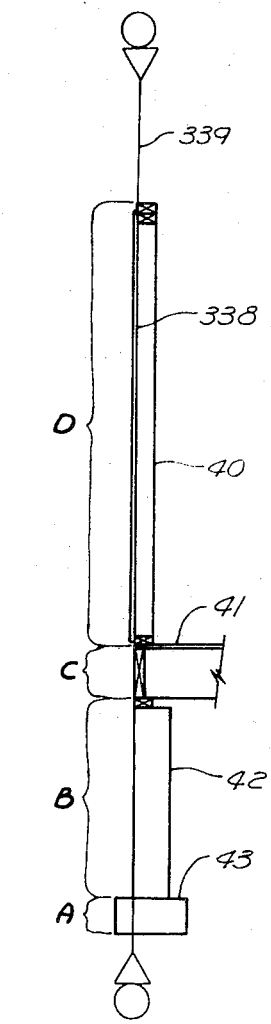
FIG. 46 is a somewhat diagrammatic sectional view through an exterior wall of a residential-type structure.

FIG. 46 shows a section through a typical exterior wall of a residential-type building. A footing 43 is also identified with an A. A foundation wall 42 and sill plate are embraced by the identifying letter B. Joists and a subfloor 41 are embraced by an identifying letter C and a sole plate, stud, top plate, and loose plate, making up a stud wall 40, are embraced by the identifying letter D.

A vertical reference perpendicular line 339 is a line perpendicular to the base. Reference symbols at each end of the line 339 symbolize relation of the vertical reference line 339 to a reference line on the base which is colinear with an association line in a representation, and mark a measurement index line for location of the construction illustrated in a reference standard detail. The vertical reference line 339 marks the outer face 338 of the loose plate, top plate, studs, and sole plate of the stud wall 40, the subfloor 41, the edge joist, the sill plate, and the foundation wall 42. The footing 43 projects beyond the face of the foundation wall 42, but it is exactly located with respect to the reference line 339 by means of the reference standard detail shown in FIG. 47.

FIGS. 47 through 54 illustrate reference standard details.

Figure 47:
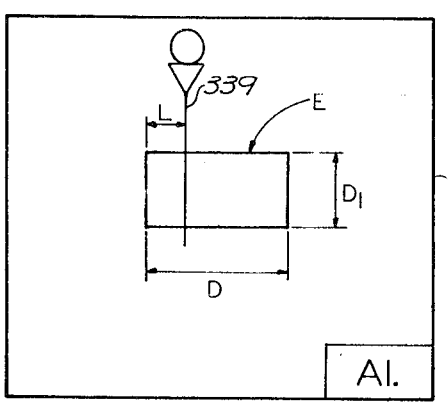
FIG. 47 is a reference standard detail drawing of an appurtenant planning element which is the portion of the wall designated as A in FIG. 46.

In FIG. 47, the details of the footing 43 are shown on a sheet of paper or the like 44. The symbol A1 in the lower right-hand corner of the sheet 44 identifies a particular footing, and would be used as an indicium of reference standard detail on the base, as shown at the location L6, F15 in FIG. 55. For the particular footing A1, the reference standard detail on the sheet 44 will convey all of the information required for the forming of the footing, i.e., the dimensions in both conventional terms as feet and inches or meters and centimeters, and in terms of units of the scale 333, and the location L of a face with respect to the reference line 339, except its length.

Figure 48:
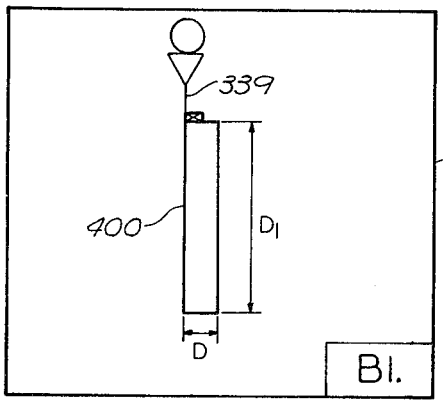
FIG. 48 is a reference standard detail drawing of an appurtenant planning element which is the portion of the wall designated as B in FIG. 46.

In FIG. 48, a reference standard detail identified as B1 illustrates and gives all of the essential information about a foundation wall 400 and a sill plate.

Figure 50:
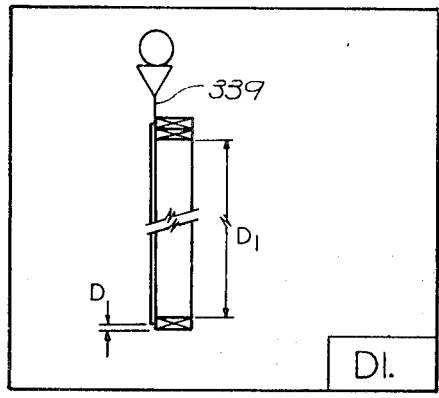
FIG. 50 is a reference standard detail drawing of a primary planning element with a center section removed, which is the portion of the wall designated as D in FIG. 46.
Figure 49:
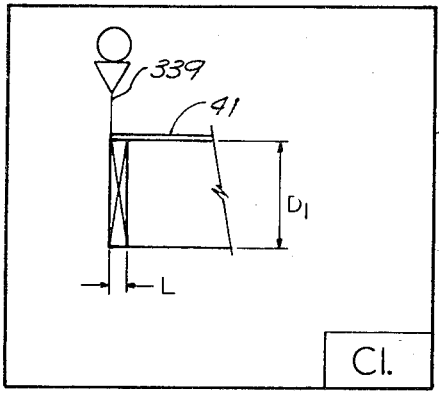
FIG. 49 is a reference standard detail drawing of a primary planning element which is the portion of the wall designated as C in FIG. 46.

Similarly, a reference standard detail identified as C1 provides information about an edge joist and a floor joist, as well as the subfloor 41. In FIG. 50 a reference standard detail D1 illustrates and gives required information about the sole plate, top plate and loose plate, and stud.

Although not shown on the reference standard details A1 through D1 it is generally desirable to show on the same sheet of paper the normal spacing of joists etc., in terms of the units of measurement conveyed by the base reference lines. For example, the joist may be shown with the joist centerline coinciding with alternate reference lines. Also such general notes as "stagger subflooring joints at joist" may be added to the reference standard details. A person skilled in the art of conveying information on appropriate size, spacing and material requirements for "members" or pieces required to perform a function can, in the general case, convey this information in terms of location with respect to reference lines.

In FIGS. 51 through 53, three different reference standard details are shown, all with a prefix W, for window, illustrating different window framing.

In FIG. 51, reference symbols locate a centerline lengthwise of a wall framing required to achieve a window opening which has a half-width indicated by the reference numeral 412A. Pieces 413 are those pieces required to fabricate the window opening regardless of the location of the opening in a wall. The piece 414 is a top plate which extends horizontally along the wall and its length is not dependent upon the dimensions of the window opening piece 413. The pieces 416 are vertical members which are placed adjacent pieces 413. The reference standard detail conveys the location of the pieces 416 with respect to the pieces 413. A centerline 341 is a projection of reference line 322 of the window piece designator 155 shown in FIG. 41. If the reference line 322 is placed midway between reference lines 30, as shown, for example, in the upper leftmost example of indicia of reference standard detail W in FIG. 41, one of lines 341a may be used to locate the window opening with a particular reference line 30, rather than with two such reference lines.

In FIG. 52, a centerline 344 is shown. Pieces 420 are those required to fabricate the wall framing of this particular window opening, designated as WS6. The overall length (as distinguished from height) of the framing pieces in this detail, is an even multiple of the measuring units 331 of the measuring scale 333. If the framing shown in the reference standard detail WS6 is used, the reference line 322 of window piece designator 155 as shown in FIG. 41 must be placed on a reference line 30.

In FIG. 53, a centerline 345 is shown. In this detail, identified as WS7, the overall horizontal distance is an odd multiple of the measuring unit 331 of the measuring scale 333. In this detail, the reference line 322 of window piece designator 155 must be placed midway between adjacent reference lines 30. The pieces 424 are those pieces required to fabricate the wall framing.

FIG. 54 illustrates a reference standard detail P1 in which drainage fittings are defined and their location conveyed with respect to identifying units 334 of the measuring scale 333. In this figure, a wall stack 426 is shown and located with respect to the centerline of a toilet and with respect to a horizontal drain to a wash basin. Location symbols 343 will suffice to locate the wall stack and wash basin if association lines 302 and 303 as shown in FIGS. 25 and 26 are placed on a reference line 30, or midway between them. As in all of the other reference standard details, dimensions as required are given. Wall stack 426 may be located with respect to indicators 346, one of which uniquely identifies the partition in which the wall stack is placed, by dimensions 429.

Figure 57:
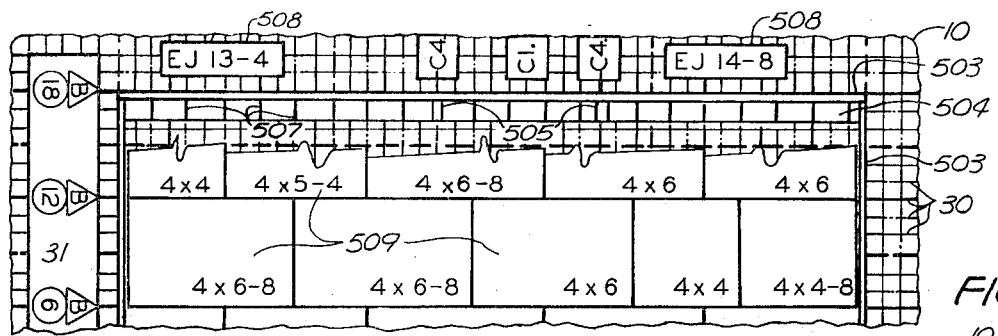
FIG. 57 is a fragmentary top plan view, partly broken away, of detail planning element representations in the form of subflooring, joist and edge joists, and of reference standard detail indicia, mounted on a base.
Figures 55, 56:
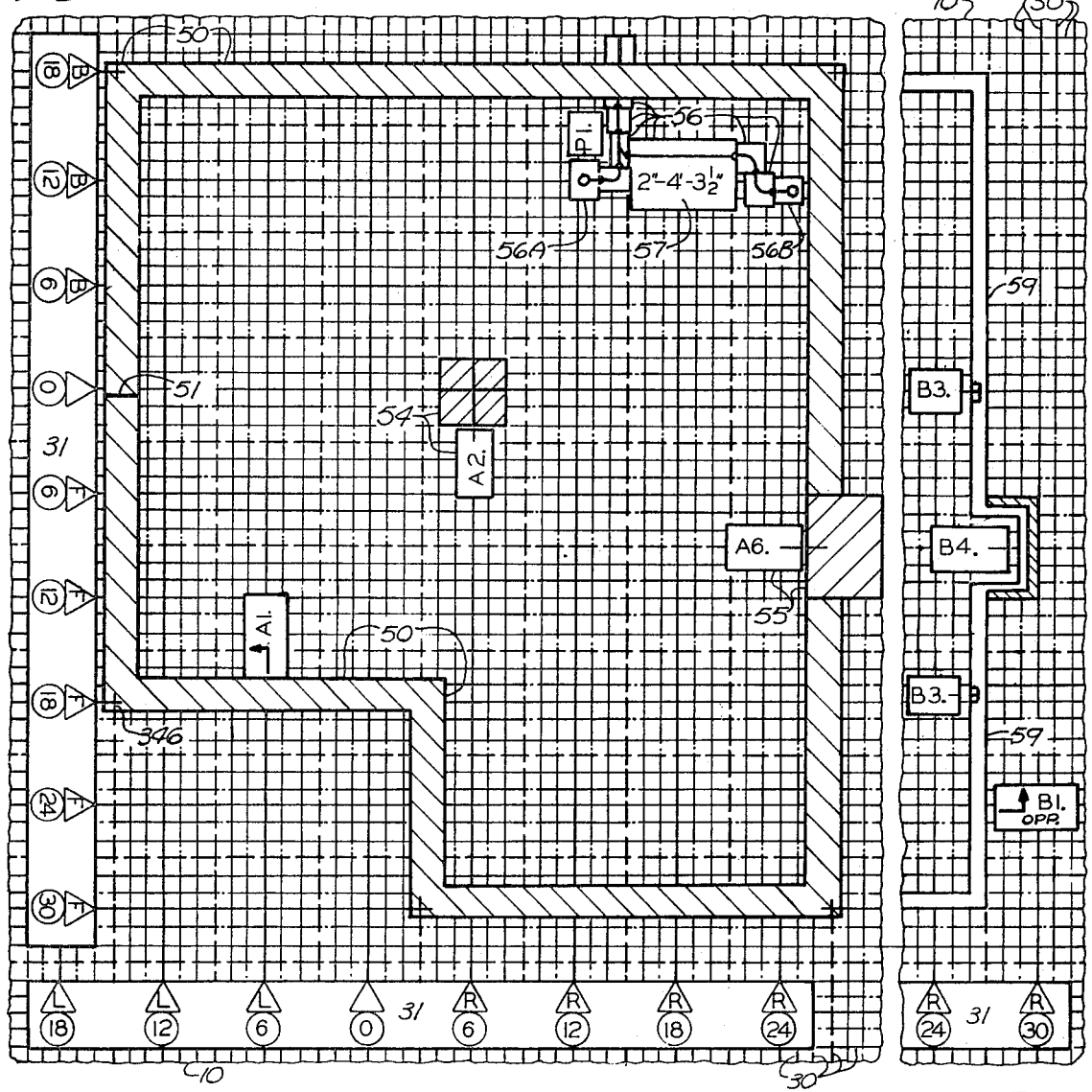
FIG. 55 is a fragmentary top plan view of a base upon which appurtenant planning element representations in the form of footings and detail planning element representations in the form of drainage piping are mounted.
FIG. 56 is a fragmentary top plan view of a base on which appurtenant planning element representations in the form of foundation walls and detail planning element representations in the form of beam seats are mounted.

FIGS. 55 through 57 illustrate the way in which the base and indicia of reference standard details are used to convey all of the information required by a contractor to determine, with reference standard details, an exact bill of materials and for his employees to construct a building.

In FIG. 55, loose wall footing pieces 50 are mounted on base 10. The pieces 50 are of a width preferably determined by the scale of the model. They may be of any length, and may be cut to fit. Preferably, they have along and spaced from one edge an association line, 346, spaced a distance L as shown in reference standard detail A1. More than one piece can be utilized in any reach, as indicated in the left-most footing as viewed in FIG. 55, but the several strips should butt as shown at 51. As will be explained in further detail hereinafter, with such an arrangement, the various strips can be removed from the base when the layout has been completed, their total length measured, and an immediate measure of material requirement made.

The layout of the wall footing pieces 50 not only provides a measure of amount of material but shows the exact location of footings with respect to other building and planning elements, and with respect to land boundary or reference points also, if two rectilinear coordinates on the land are located with respect to the mensuration strips of the base.

The same observation is applicable to column footing 54, fireplace footing 55, and drainage pieces 56.

Indicia of reference standard details, with index lines in unambiguous relation to reference lines on the base, not only identify the reference standard details but locate the elements to which the reference standard details relate.

In some instances, it may be desirable to place a card 57 with conventional dimensions on it to indicate measurement which, for one reason or another, is not exactly consistent with the units of measurement assigned to the reference lines of the base.

In FIGS. 5 and 6, foundation wallpieces 59 are shown mounted on the base 10. It will be observed that, consistent with the placement of the wall footing pieces at a position at which association lines coincide with reference lines on the base, the outer edges of the foundation wallpieces are contiguous reference lines with which the association lines of the wall footings coincide.

It can also be seen that the foundation wallpieces 59 could be superimposed upon the foundation wall footing pieces. In the preferred method, which will be described in greater detail hereinafter, however, they are laid out successively, and a photograph of each layout is made to memorialize the exact layout, so that the base can be used for each step without adding confusion to the process.

It will be seen in FIG. 56 that beam seat locations are indicated by indicia of reference standard details B3, the index or association lines of which locate the position in the wall, and the corresponding reference standard detail of which provides all of the specific detail needed to accomplish their formation.

An indicium of reference standard detail B4 locates, and by means of the corresponding reference standard detail, conveys the information required to construct fireplace walls.

In FIG. 57, loose pieces convey information on the floor framing for the residential-type building shown in FIG. 41. Edge joist pieces 503 are mounted contiguous and along appropriate reference lines. A joist location piece, initially blank, is placed adjacent to piece 503 along the reference line B18 in FIG. 57. At the partition locations as conveyed by FIG. 41, double marks 505, neither of which, in this illustrative embodiment, align with a reference line 30, are drawn on the piece 504. The double marks 505 indicate double joists at the partition locations. Indicia of standard details C4 identify a reference standard detail C4 which gives location dimensions for each of the joists represented by the marks 505. Lines 507, representing center lines of floor joists are marked on the piece 504. These marks do align with reference lines 30. In this embodiment, edge joist lengths are written on cards 508. Pieces 509 of appropriate size represent plywood subflooring. Each piece may be marked with its dimensions in conventional units or the units of the scale 333. In this embodiment, conventional units are shown. In FIG. 57, all of the joists, edge joists and plywood panels have been located and the location has been clearly conveyed to accomplish the following: double joists with space between have been provided at partitions; edge joist has been supplied at a floor joist location; plywood subflooring end joints have been staggered in adjacent rows; and plywood end joints have been located at floor joist locations.

Figure 58:
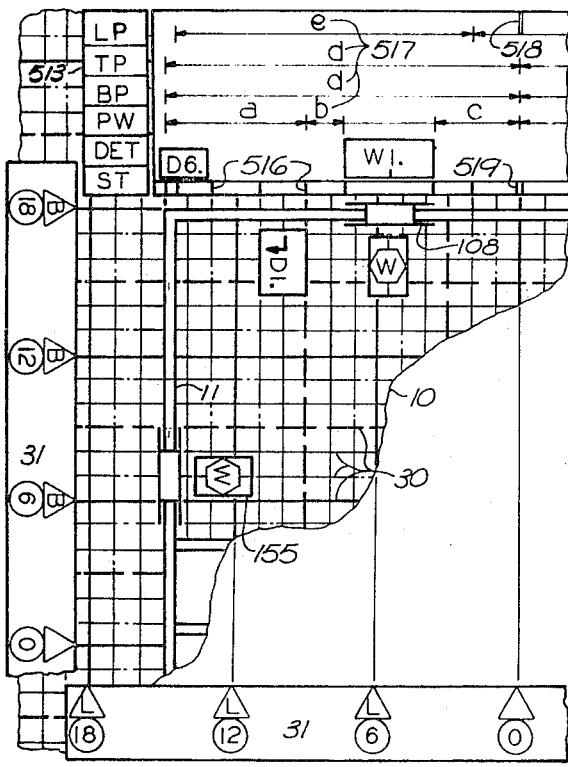
FIG. 58 is a fragmentary top plan view of a base upon which detail element representations of an exterior wall are mounted.
Figure 59:
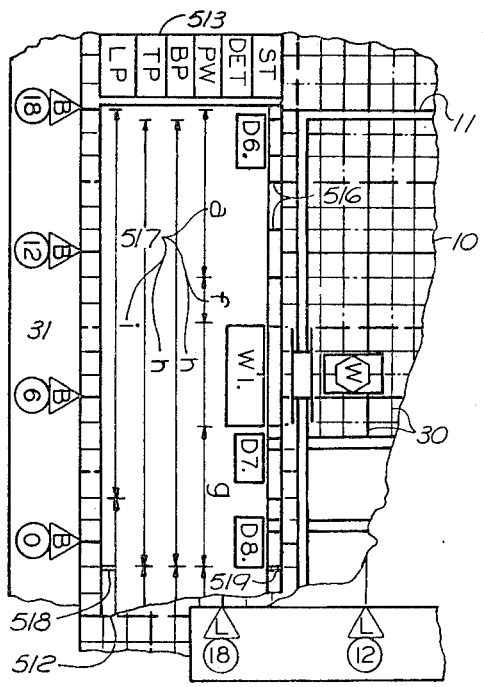
FIG. 59 is a view corresponding to the view shown in FIG. 58, with detail element representation of the exterior wall perpendicular to the wall referred to in FIG. 58.

FIGS. 58 and 59 illustrate the positioning of loose pieces on the horizontal base 10 to convey information on the wall framing for a portion of the exterior wall of the building shown in FIG. 41. Exterior wallpieces 11, window opening pieces 108 and indicia of reference standard details 155 are mounted on the base 10. Blank pieces 512 are placed adjacent the appropriate reference lines 30. Descriptive forms 513 are placed adjacent to the blank pieces 512 to designate the character of information to be conveyed to a person familiar with conventional house framing. In the illustrative embodiment, ST stands for studs, DET for detail, PW is plywood, BP is bottom plate, TP is top plate and LP is loose plate. A "row" extending from and adjacent a box ST is marked to locate studs. The reference numeral 516 indicates stud locations. Reference numeral 519 indicates line marks conveying that a stud is positioned so that its faces align with a reference line 30.

In the detail row, indicia of reference standard details are placed. The indicium D6 has reference to stud location and construction. The indicium W1 has been discussed heretofore in connection with the reference standard detail shown in FIG. 51. The lines *a*, *b*, and *c* in the row adjacent the abbreviation PW represents width of plywood of uniform height in the exterior wall. The locations and lengths of the loose plate, top plate, bottom plate and width dimension of the plywood sheets, are indicated in the rows adjacent the various boxes in which the abbreviations are. Dimensions 517 may be given, although the dimensions in terms of units of the scale 333 can be determined easily from the mensuration strips. It is more important to specify the dimensions when the lengths are not multiples of units or half-units. Thus, the loose plate dimension in FIG. 58 will be less than a full multiple by the width of the loose plate at right angles to it.

If prefabricated wall sections are used, their location can be indicated by lines 518. Such a construction is suggested in FIG. 58, wherein an outer face of a stud, and the outer edges of the bottom and top plates and two outer vertical edges of the plywood at both ends, all coincide, while the loose plate is staggered with respect to the top plate.

In FIG. 59, a similar chart 513 is positioned at right angles to the chart 513 of FIG. 58. The advantage of the removable and replaceable mensuration strip is here illustrated, where the left "vertical" mensuration strip has been moved to the left as viewed in FIG. 59. The principles involved are exactly the same as those involved in the discussion in FIG. 58, the absolute dimensions and locations being consistent with the requirements of the exterior wall perpendicular to the wall to which the dimensions in FIG. 58 were applied.

Figure 60:
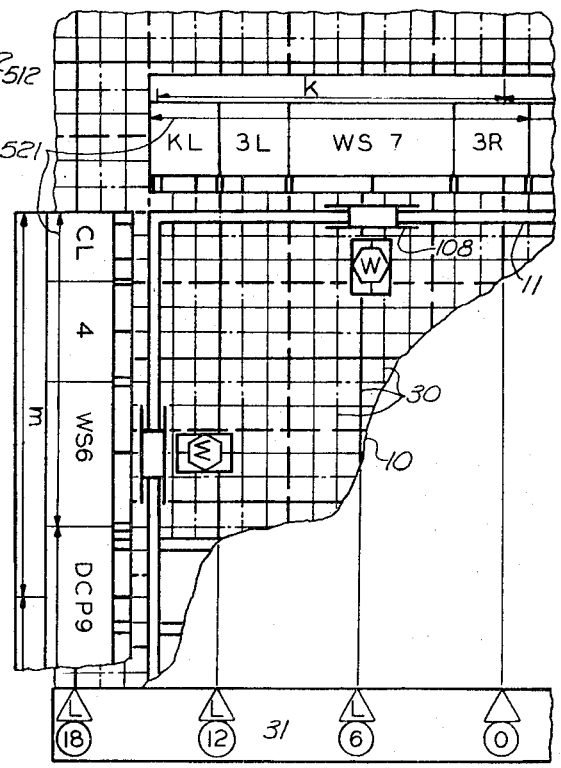
FIG. 60 is a view corresponding to the views shown in FIGS. 58 and 59, with representations of standard components mounted adjacent wallpieces.

FIG. 60 illustrates a simplified arrangement, in which the external walls are framed with standard components. It can be appreciated that the types and lengths of standard components available are factors which must be considered in the location of windows, doors, partitions and the like in the general arrangement. As was suggested in connection with the arrangement shown in FIG. 58, the loose plates tie together successive prefabricated units, and their dimensions are indicated. Otherwise, the markings are chiefly to indicate the position of vertical members within a component identified by the identifying symbol of a reference standard detail. Indicators 521 may be used to show the limits of subassembly of components.

Figure 61:
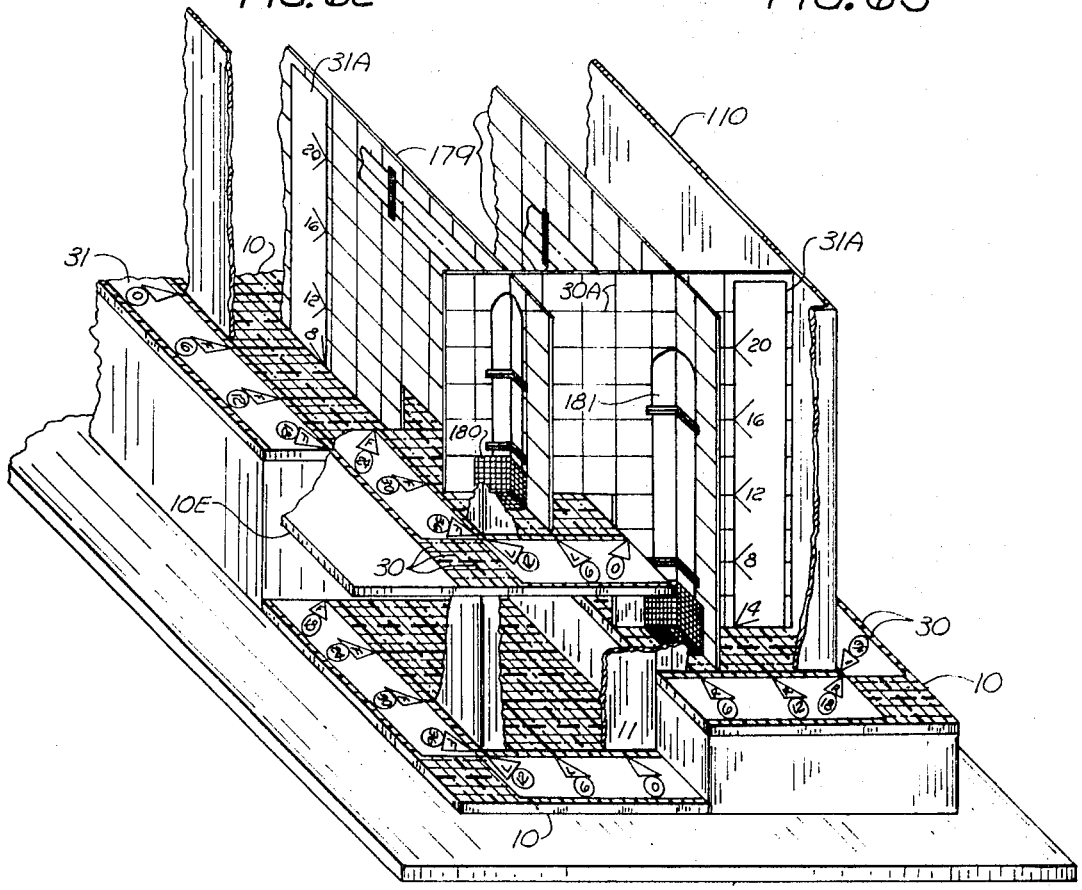
FIG. 61 is a fragmentary view in perspective of a multilevel board and model, with vertical and horizontal mensuration strips.

In FIG. 61, multiple horizontal base pieces 10 are shown placed vertically with respect to one another and vertically lined boards are provided for conveying vertical distances or measurements. Preferably, transparent base supports are used for upper base pieces 10E which project laterally from the lined portions of the elevated bases, whereby the elevated bases can be supported outboard of the model structure without obscuring the mensuration strips on the lower base 10. The vertical boards 179 are mounted in unambiguous relation to reference lines 30 on the horizontal bases, and preferably are equipped with pegs, in the manner of exterior wall sections. The vertical marked boards 179 have appropriate reference lines 30A and mensuration strips 31A. The vertical distances of supporting pieces for the elevated bases 10E, and the thicknesses of the elevated base pieces 10E may be in multiples of the distances between line markings 30A. Pipe representation pieces 181 may be placed in unambiguous relation to line markings 30A of vertical parts 179 as well as to reference lines 30 of the horizontal bases 10 and 10E.

Figure 62:
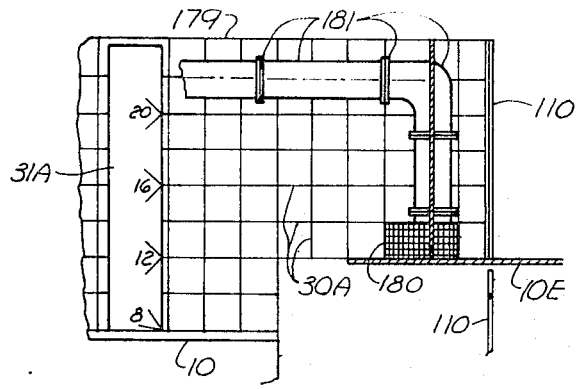
FIG. 62 is a sectional view taken along the line L6 looking in the R-direction of FIG. 61, showing vertical and horizontal reaches of piping within the model.

In FIG. 62, a detail of a vertical line board and piping representation from FIG. 61 is shown. Equipment 180, shown diagrammatically, is located exactly with respect to both the vertical and horizontal reference lines.

Figure 63:
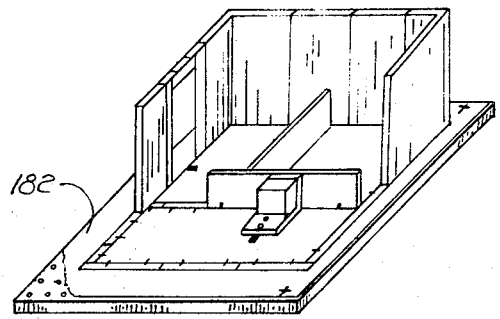
FIG. 63 is a view in perspective of a partly completed model on a model base on which a pattern has been mounted.

In FIG. 63 a system is shown in which the model pieces of this invention are used for educational and amusement purposes, both without thought of conveyance of all of the information conveyed by the system described heretofore. An expendable sheet 182 of thin paper is mounted on the base. Either suggested outlines are drawn or printed on the paper, or not, as desired. In the embodiment shown, such an outline is provided, on which exterior walls and interior partitions are mounted. The model pieces can be used to teach building design, and also interior arrangement. For example, it can be used to stimulate the thinking of persons interested in arrangements of fixtures, appliances and interior partitions to accomplish the most effective utilization of a given space determined by the external walls.

Referring now to FIGS. 1 and 41 for one illustrative method of using the elements which have been described heretofore, mensuration strips 31 are mounted on the base 10 along reference lines 30, at right angles to one another. The mensuration strips are each provided with a zero reference symbol the apex of which coincides with a heavy reference line on the base. The length of the mensuration strip and the position of the zero reference symbols 320 and 321 are, within limits, arbitrary. The length should be greater than the exterior dimensions of the building, but only sufficiently longer to provide space on the base between the mensuration strips and the model pieces representing the exterior walls to allow for the placement of indicia. If the base is sufficiently large, once the building layout is complete, the strips may be moved away from the building to permit the location of planning elements exterior of the building, such as sewer and water pipes, and even landscaping elements.

The mensuration strips 31 will ultimately have counterpart reference lines at the construction site, if only in the form of chalk lines properly oriented with respect to the property and with the zero reference points marked. However, at the planning stage, it is only necessary to know approximately the outer limits of dimensions.

In planning the house which is illustrated, the representation of primary planning elements are first put into place, because it is upon the arrangement of the primary planning elements that the nature and arrangement of the other, appurtenant and detail, planning elements depend. It is possible to begin with the primary planning elements which make up the external appearance of the house, on the panels 20, but the usual approach would be to begin by outlining the house with the placement of the exterior walls.

The exterior walls can be represented by the use of exterior wallpieces of the type shown in FIGS. 2 through 4, by fitting them together and mounting their pegs in the holes in the base. Appropriate lengths of exterior wall model pieces, spacing of pegs in the model pieces and spacing of holes in the base in relation to the spacing of base reference lines can be selected to allow a model exterior wall to be built in lengths which are measured in units of the base reference line spacing or some multiple of the units of the base reference line spacing. For example, the base and exterior wallpieces shown in FIGS. 2 through 4 allow model exterior walls to be built in lengths which are measured in three units of the base reference line spacing. For example, if the base reference line spacing represents 8 inches, the location measurements for exterior walls when the model is used as a construction arrangement will be conveyed in multiples of 2 feet.

The external window and door openings may be indicated by slipping opening pieces 108 over the standing exterior walls, with the association lines 34 in some unambiguous relation to a reference line 30, either on a reference line or midway between two reference lines. Again the positioning of the association line 34 in one of the two attitudes is a limitation of sorts, but only within half a unit's length. The placement of the opening with respect to exterior wallpieces 11 will affect the detail planning elements of one or more of the exterior wall planning elements, a matter which is taken care of by reference standard details, the location association of which is ascertainable by reference to the association line 34 with respect to the association lines of the exterior wallpieces and the base reference lines, but in the general planning to produce a construction arrangement phase, it is unnecessary to consider the consequences of the placement of any of the representations including the openings.

When the exterior walls are in place, the interior partitions can be located and mounted, preferably along a reference line on the base or midway between reference lines. However, because the mounting of the partition model pieces in the embodiment shown is independent of the holes in the base, the partitions can be mounted anywhere. Again, the interface of partitions and an exterior wall will make a difference in the detail planning elements of the exterior wall, in that, for example, in wood frame construction, a stud or perhaps a double stud will be provided at the interface with the partition, but, as has been pointed out, in the general planning to produce a construction arrangement, this is of no concern.

Closet pieces, partition opening model pieces, door swing representations, kitchen and bathroom fixture pieces, fireplace model pieces and any other primary planning element pieces appropriate to the house are then placed in position with respect to the partitions and exterior walls. It can be seen that there is no particular order in which any of the primary planning element representations need be mounted. If for example, the house is in effect to be built around some fixture, its representation can be located first, and the partitions and exterior wallpieces erected on the base thereafter.

In any event, the prospective owner or the architect can arrange and rearrange every primary planning element representation until he is completely satisfied. He can then, if he so desires, mount on the panels 20 the exterior representation model pieces which will enable him to produce a number of elevations conforming exactly to the length, height and position of the exterior walls and openings, of the exterior of the house.

Various indicia of reference standard details or descriptive markers or both, as illustrated in FIG. 41, can be put in place to designate the character of openings, the nature of living areas, and the like.

In the preferred method of this invention, the construction arrangement on the base is then photographed in top plan, preferably in color. Within wide limits regardless of the effect of the height of the various representations of planning elements on the photograph, which as a practical matter produces some perspective as distinguished from pure plan, the photograph will serve as a permanent conveyance of all of the information about relative positions and absolute lengths and positions in terms of the units marked by the reference lines, which most general planning requires. Four elevational photographs serve as permanent conveyances for the external appearance and relation of external appearance to the model construction arrangement of the house on the base.

The method for general planning as described above is applicable when the construction is to be achieved for the most part by purchase of materials and fabrication of detail planning elements from the purchased materials. It is noted that the method is not restricted to the planning of conventional wood frame construction. Under certain conditions it may be desirable to fabricate and inventory standard components without consideration of their use in any specific construction arrangement. Such standard components may be fabricated in lengths which are related to the spacing of the base reference lines and certain of these standard components may be fabricated with suitable detail planning elements located in appropriate relation to spacing of base reference lines to accommodate planning element interfaces.

When the apparatus of this invention is used to accomplish general planning to produce a construction arrangement which will be constructed wholly or in part of standard components, a modification of the general planning procedure as outlined above is required. This modification consists of using representations of the standard components in the general planning. This is shown in FIG. 60. The use of representations of standard components may limit the choices available to the planner. For example, FIGS. 58 and 59 show a window placed at B7 in the wall along L15. In FIG. 60, which illustrates the addition of representations of inventoried standard components, the window in the wall along L15 must be placed at B8 to be consistent with the placement of the representations of standard components. It is further noted that exterior wallpieces of the type shown in FIGS. 2 through 4 may be constructed to serve as representations of standard components.

It may be desirable to perform general planning when standard components are to be used for a limited portion of the construction of primary planning elements. In this event, representations of inventoried standard components are placed in appropriate specific locations. Fabrication details of other planning elements as necessary for adaptation to standard components may be conveyed by appropriate placement of indicia of reference standard details.

The above is a description of general planning by placement of representations to produce a construction arrangement and to broadcast the same by photographs of the construction arrangement so produced.

In the general case the construction required to accomplish the construction arrangement produced as described above requires fabrication of pieces, placement of concrete forms etc., subsequent to finalization of the construction arrangement.

The method of detailing to provide detail information for construction for the construction arrangement of FIG. 41 is shown in FIGS. 55, 56, 57, 58 and 59.

In FIGS. 58 and 59 is illustrated the method of mounting descriptive forms, representations of detail planning elements, and indicia of reference standard details in unambiguous relation to representations of a portion of the exterior wall of the construction arrangement of FIG. 41 to produce detail information for construction. The composite mounting may be photographed. The reference standard details will depend upon the desired nature of the construction. The person accomplishing the placement i.e., detailing, may be guided by his knowledge of the desired construction and by his observance of the likeness of the representations in the construction arrangement to actual construction, e.g., a representation in the construction arrangement of a window may be of a double hung window. This procedure would be followed by the detailer when identification of primary planning elements is accomplished by "supplementary specification."

As described heretofore suitable identification of planning elements in a construction arrangement may be accomplished by indicia of reference standard details applied to the representations of primary planning elements. When there exists "construction arrangement identification of planning elements by applied indicia" and representations of detail planning elements are correspondingly identified, applicable representations of detail planning elements and indicia of reference standard detail may be correctly placed in relation to representations of primary planning elements or appurtenant planning elements by "location association." It is possible, provided that representations of detail planning elements are flat pieces, to conveniently superpose representations to accommodate planning element interfaces.

In addition to the methods described above, detailing of a construction arrangement may be accomplished by a digital computer suitably programmed to accept indicia of reference standard details and base reference line identification symbols as input. The input could be obtained by location association and observation of indicia of reference standard details applied to representations of primary planning elements in the construction arrangement.

In FIG. 57 is illustrated the method of mounting representations of detail planning elements in unambiguous relation to base reference lines and indicia of reference standard details in unambiguous relation to base reference lines and to representations of detail planning elements to convey detail information for construction of a portion of the floor of the construction arrangement of FIG. 41. The positions of the joists are material to the positions of the plywood subflooring, and both are illustrated in FIG. 57. A photograph of the representations of the detail planning elements, which representations may be color coded, the indicia of reference standard details, and the information markers setting forth the lengths of edge joists, mounted as shown in FIG. 57 along with reference standard details C1 and C4 provide detail information for construction of the portion of the floor shown.

The character and placement of the representations of primary planning elements govern the placement of the representations of appurtenant planning elements. Thus the location of the exterior walls determines the location of the foundation walls and footings. In the wood frame construction illustrated, the foundation wall is coextensive with an edge of the sill plate, edge joist, and bottom plate, because in the embodiment shown, the location relation illustrated in FIG. 46 is selected. Some other practical location relation could have been used. In any event, the location relation is conveyed by the appropriate reference standard detail. The position of the outer edge of the foundation wall and of a representation thereof is therefore immediately conveyed by the picture of the model of the construction arrangement of the primary planning elements, except for such elements as the fireplace of which the reference standard detail will convey the information required. The location of footings and of representations thereof is also determined by the location of the representations of the primary planning elements, as illustrated in FIGS. 46, 47 and 55.

As was pointed out in connection with the description in FIG. 55, the flat pieces making up the representations of appurtenant planning elements of the footings form a convenient direct measure of the amount of concrete required for the footings. A photograph of the placement of the pieces as illustrated in FIG. 55, combined with the reference standard details A1, A2, and A6 provide all of the information required by the builder for the ordering of materials and the location and emplacement of the footings. Similarly, as illustrated in FIG. 56, a photograph of the base with flat foundation wallpieces together with reference standard details B1, B3, and B4 provide all the information required by the builder for the ordering of material and the forming of the foundation wall.

The FIGS. 55, 56, 57, 58 and 59 illustrate the method of detailing to produce detail information for construction of the construction arrangement of FIG. 41. The Figures do not convey all the detail information required for construction, e.g., the roof is not illustrated.

However, it will be readily recognized by one skilled in the arts of general planning and detailing that the method illustrated in FIGS. 55, 56, 57, 58 and 59 may be applied to provide detail information for construction of all primary and appurtenant planning elements of a construction arrangement of the type as shown in FIG. 41 including roof construction.

Having thus described the invention, what is claimed and desired to be secured by Letters Patent is:

1. A planning and building information-conveying device comprising a base having spaced reference lines forming a reference grid and a multiplicity of holes consistently positioned with respect to and spaced along said reference lines, and representations of primary planning elements, said representations being dimensionally stable and self-supporting and having a plurality of pegs projecting from a lower edge, said pegs being spaced to fit into spaced ones of said holes in the base and all positioned to bear the same spatial relation to adjacent edges of said representations, said representations being mounted on said base by means of said pegs, the vertical of said representations adjacent said base being representative of the surfaces of the elements of said representations.

2. The device of claim 1 wherein the holes in the base are symmetrically offset on either side of the said reference lines, and the representations are so proportioned that an edge of said representations lies along and close by a line when the pegs are mounted in the holes.

3. The device of claim 1 wherein the holes lie along particularly identified lines.

4. The device of claim 1 wherein primary planning elements of the representations are exterior wall segments.

5. The device of claim 4 wherein saddle-shaped opening designations are provided, mounted on said exterior wall segments, extending substantially to the base and provided with at least one association line at its edge adjacent the base in unambiguous relation to the said grid lines.

6. The device of claim 4 wherein planning elements of other, different representations are interior partitions, said interior partition representations being dimensionally stable and self-supporting and having temporary mounting means for mounting and holding said interior partition representations directly to the said base in any desired position relative to said exterior wall segments and grid lines.

7. The device of claim 1 wherein planning elements of other, different representations are fixtures, with association lines in unambiguous relation to said grid lines and to at least one of said exterior wall and interior partition representations.

8. The device of claim 3 wherein a mensuration strip is removably mounted on the base in direct identifying relation to particularly identified lines.

9. The device of claim 1 wherein the base has a substantially horizontal planar surface and at least one straight edge, the reference grid being made up of lines parallel with and lines perpendicular to the said edge, and an elevation model support extending along said edge, said support having means for holding exterior building surface representations.

10. The device of claim 6 wherein the mounting means are adherent.

11. The device of claim 6 wherein the mounting means are magnetic and the base has a face to which the magnetic mounting means are attached.

12. The method of conveying information about a structure comprising establishing a planar grid of intersecting sets of parallel lines, mounting on said grid in unambiguous relation to said lines a plurality of planning element representations and mounting in unambiguous relation to said lines and to said representations indicia of reference standard details.

13. The method of claim 12 wherein the information conveyed is the location, appearance and measurement of a building structure, which includes the steps of establishing a rectangular grid, establishing a zero reference line on said grid, and erecting on said grid in significant relation to said zero reference line a plurality of three dimensional, self-supporting primary planning element representations.

14. The method of claim 12 including providing means for identifying the reference lines in the form of discrete alphanumeric symbols, the representation of each different planning element being designated by discrete alphanumeric symbols and each different indicium being designated by a discrete alphanumeric symbol assimilable by a computer.

15. The method of claim 12 wherein the planning element of the representation includes walls, and the method includes mounting on said walls representations of openings, said opening representations having association lines on them, said opening representations being mounted in unambiguous relation to said walls and to said base reference lines and indicia of reference standard details relating to said opening representations being placed on said base in unambiguous relation to said opening representations association lines.

16. The method of claim 12 wherein a plurality of primary planning elements are represented, and planning elements of the representations include walls and fixtures, the said fixture representations having association lines, and the method includes the step of positioning the association lines of the fixture representations in unambiguous relation both to adjacent walls and reference base lines and placing indicia of reference standard details on said base in unambiguous relation to said association lines.

17. The method of conveying information including the location, appearance and measurement of a building structure comprising establishing a planar grid of intersecting sets of parallel reference lines, establishing a zero reference line on said grid, and erecting on said grid in unambiguous relation to said reference lines in significant relation to said zero reference line a plurality of three-dimensional, self-supporting primary planning representations.

18. The method of claim 17 including the step of subsequently photographing the said representations, indicia and base reference lines in place.

19. The method of claim 17 wherein the reference lines are peculiarly identified.

20. The method of conveying information relevant to a construction arrangement comprising mounting in unambiguous relation to reference lines on a base a representation of a planning element; and mounting on said base, also in unambiguous relation to at least one reference line on said base, an indicium of a reference standard detail relating to the actual structure of said planning element representation.

21. The method of claim 20 wherein the reference lines are uniquely identified by discrete characters, the representation of each different planning element is designated by a discrete character and each different indicium is designated by a discrete character, said characters being assimilable by a computer.

22. The method of claim 20, including the further step of photographing the said representation, indicium and base reference lines in place.

23. The method of claim 20 wherein the representation is a foundation wall, the representation being of exact length so that the total length of the representation is a direct function of the volume of the foundation wall.

* * * * *

UNITED STATES PATENT OFFICE
CERTIFICATE OF CORRECTION

Patent No. 3,646,690      Dated March 7, 1972

Inventor(s) Robert L. Feagan

It is certified that error appears in the above-identified patent and that said Letters Patent are hereby corrected as shown below:

Column 3, line 6, after "wallpiece" cancel "doe" and insert --- does ---; line 17, after "disclosed," insert --- and---.

Column 10, line 41, cancel "arises" and insert --- 32A. ---.

Signed and sealed this 11th day of July 1972.

(SEAL)
Attest:

EDWARD M. FLETCHER, JR.
Attesting Officer

ROBERT GOTTSCHALK
Commissioner of Patents